(12) United States Patent
Kawanami et al.

(10) Patent No.: US 11,125,307 B2
(45) Date of Patent: Sep. 21, 2021

(54) SUPPORT APPARATUS

(71) Applicant: SONY CORPORATION, Tokyo (JP)

(72) Inventors: Yasunori Kawanami, Tokyo (JP); Kenichiro Nagasaka, Tokyo (JP); Kazuo Hongo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 143 days.

(21) Appl. No.: 16/301,547

(22) PCT Filed: Feb. 24, 2017

(86) PCT No.: PCT/JP2017/007097
§ 371 (c)(1),
(2) Date: Nov. 14, 2018

(87) PCT Pub. No.: WO2017/208527
PCT Pub. Date: Dec. 7, 2017

(65) Prior Publication Data
US 2019/0293156 A1    Sep. 26, 2019

(30) Foreign Application Priority Data

May 30, 2016   (JP) ............................. JP2016-107363

(51) Int. Cl.
*F16H 21/44* (2006.01)
*F16H 35/02* (2006.01)
(Continued)

(52) U.S. Cl.
CPC ........... *F16H 21/44* (2013.01); *F16H 19/001* (2013.01); *F16H 21/16* (2013.01); *F16H 35/00* (2013.01);
(Continued)

(58) Field of Classification Search
CPC ....... B62D 57/032; B62D 57/02; F16H 21/16; F16H 21/18; F16H 21/44; F16H 35/02;
(Continued)

(56) References Cited

U.S. PATENT DOCUMENTS

| 4,364,593 A | 12/1982 | Maeda |
| 2014/0190289 A1* | 7/2014 | Zhu ......................... B25J 9/104 74/89.22 |
| 2016/0347387 A1* | 12/2016 | Hurst ..................... B62D 57/02 |

FOREIGN PATENT DOCUMENTS

| CN | 203442082 U | 2/2014 |
| CN | 103963869 A  * | 8/2014 |

(Continued)

OTHER PUBLICATIONS

International Search Report and Written Opinion of PCT Application No. PCT/JP2017/007097, dated May 9, 2017, 06 pages of ISRWO.
Office Action for CN Patent Application No. 201780032297, dated Apr. 26, 2021.

*Primary Examiner* — Luis A Gonzalez
(74) *Attorney, Agent, or Firm* — Chip Law Group

(57) ABSTRACT

Provided is a support apparatus including a drive motor, a link mechanism that, by transmitting motive power output from the drive motor, is extendable and contractable in response to the motive power, and a pair of rotating bodies that act as a variable speed mechanism that outputs the motive power to the link mechanism by a reduction ratio according to an attitude of the link mechanism. At least part of the link mechanism forms a trapezoidal link mechanism.

8 Claims, 12 Drawing Sheets

(51) Int. Cl.
*F16H 19/00* (2006.01)
*F16H 35/00* (2006.01)
*F16H 37/12* (2006.01)
*F16H 21/16* (2006.01)

(52) U.S. Cl.
CPC ............ *F16H 35/02* (2013.01); *F16H 37/12* (2013.01); *F16H 2035/003* (2013.01)

(58) Field of Classification Search
CPC .. F16H 37/12; F16H 2035/003; F16H 19/001; F16H 35/00; A63H 11/18; B25J 9/102; B25J 9/106
See application file for complete search history.

(56) References Cited

FOREIGN PATENT DOCUMENTS

| | | | |
|---|---|---|---|
| CN | 103963869 A | | 8/2014 |
| CN | 104029786 A | | 9/2014 |
| CN | 104548608 A | | 4/2015 |
| JP | 56-62785 A | | 5/1981 |
| JP | 07-228259 A | | 8/1995 |
| JP | 2000-027971 A | | 1/2000 |
| JP | 2005118938 A | * | 5/2005 |
| JP | 2011-125966 A | | 6/2011 |
| JP | 2012-163122 A | | 8/2012 |

* cited by examiner

TOOTH SHAPE OF OUTPUT GEAR 181

TOOTH SHAPE OF INPUT GEAR 182

SHAPE, INCLUDING ATTACHING PART, OF OUTPUT GEAR 181

SHAPE, INCLUDING ATTACHING PART, OF INPUT GEAR 182

SHAPE, INCLUDING ATTACHING PART, OF OUTPUT GEAR 81

SHAPE, INCLUDING ATTACHING PART, OF INPUT GEAR 82

SUPPORT APPARATUS

CROSS REFERENCE TO RELATED APPLICATIONS

This application is a U.S. National Phase of International Patent Application No. PCT/JP2017/007097 filed on Feb. 24, 2017, which claims priority benefit of Japanese Patent Application No. JP 2016-107363 filed in the Japan Patent Office on May 30, 2016. Each of the above-referenced applications is hereby incorporated herein by reference in its entirety.

TECHNICAL FIELD

The present disclosure relates to a support apparatus.

BACKGROUND ART

Typically, in a drive system that operates by transmitting rotational power output from a power source such as a drive motor, a variable speed mechanism that converts and outputs the rotation rate and torque of the motive power input from the power source side to an output side is utilized. Also, as such a variable speed mechanism, there is proposed technology related to a mechanism that includes a pair of rotating bodies having a variable reduction ratio.

For example, Patent Literature 1 proposes a technology in which, to suppress torque imposed on a transmission body, multiple gear pairs, each having a fixed reduction ratio, are couplably provided via a clutch between an input member and an output member, while in addition, a non-circular gear pair having a variable reduction ratio is couplably provided via a clutch between the input member and the output member.

CITATION LIST

Patent Literature

Patent Literature 1: JP 2012-163122A

DISCLOSURE OF INVENTION

Technical Problem

Recently, there have been proposed a variety of support apparatus provided with a link mechanism that, by transmitting motive power output from a drive motor, is extendable and contractable in response to the motive power. In fields related to such support apparatus, further miniaturization of the apparatus is desired. Specifically, in the support apparatus, the demanded values of the rotation rate and the torque of the motive power transmitted to the link mechanism may be different depending on the attitude of the apparatus. Accordingly, by providing the support apparatus with a variable speed mechanism having a variable reduction ratio according to the properties of the above demanded values of the rotation rate and the torque, the apparatus can be miniaturized by preventing increased bulk of the drive motor associated with increasing the output of the drive motor.

Herein, in the pair of rotating bodies having a variable reduction ratio described above, there are fewer component parts compared to other variable speed mechanisms. Accordingly, by applying a pair of rotating bodies having a variable reduction ratio as the variable speed mechanism of the support apparatus, more effective miniaturization of the apparatus is anticipated. Meanwhile, in a pair of rotating bodies having a variable reduction ratio, the rotatable angle in each rotating body is comparatively smaller in some cases. Therefore, due to limitations on the range of motion of the link mechanism provided on the output side of the pair of rotating bodies, the attitude of the support apparatus may become limited.

Accordingly, the present disclosure proposes a novel and improved support apparatus in which the apparatus can be miniaturized more effectively, while also minimizing limitations on the attitude of the apparatus.

Solution to Problem

According to the present disclosure, there is provided a support apparatus including: a drive motor, a link mechanism that, by transmitting motive power output from the drive motor, is extendable and contractable in response to the motive power; and a pair of rotating bodies that act as a variable speed mechanism that outputs the motive power to the link mechanism by a reduction ratio according to an attitude of the link mechanism. At least part of the link mechanism forms a trapezoidal link mechanism.

Advantageous Effects of Invention

According to the present disclosure as described above, it is possible to miniaturize the apparatus more effectively, while also minimizing limitations on the attitude of the apparatus.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
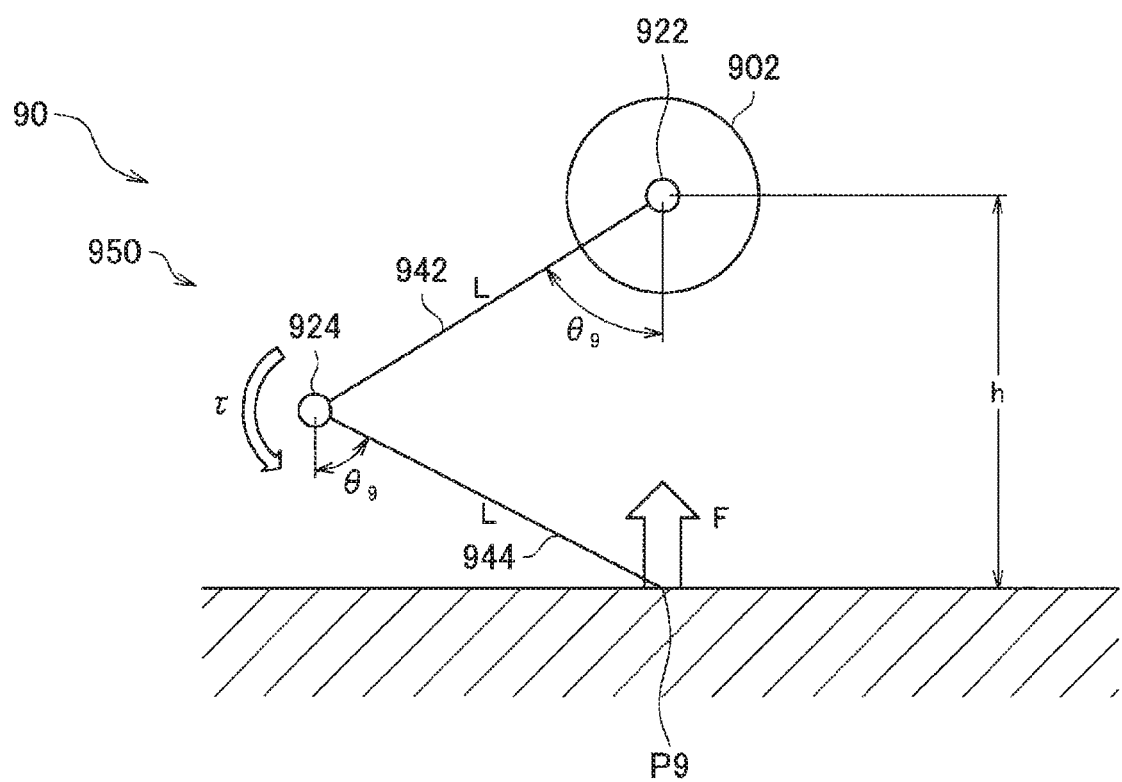
FIG. 1 is a schematic depiction illustrating an example of a diagrammatic configuration of a support apparatus.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.
1. Introduction
2. Overview of present technology
2-1. Diagrammatic configuration of support apparatus
2-2. Reduction ratio of non-circular gears
2-3. Output properties of drive motor
3. Support apparatus according to embodiment
3-1. Overall configuration of support apparatus
3-2. Trapezoidal link mechanism
3-3. Reduction ratio of non-circular gears
4. Conclusion

1. INTRODUCTION

As described above, recently there have been proposed a variety of support apparatus provided with a link mechanism that, by transmitting motive power output from a drive motor, is extendable and contractable in response to the power. FIG. 1 is a schematic depiction illustrating an example of a diagrammatic configuration of a support apparatus 90 provided with a link mechanism 950. FIG. 1 illustrates a diagrammatic configuration of the support apparatus 90 that supports a mass 902. The support apparatus 90 is provided with the link mechanism 950 and a drive motor which is not illustrated. The link mechanism 950 is configured such that by transmitting motive power output from the drive motor, the link mechanism 950 is extendable and contractable in response to the motive power.

Specifically, as illustrated in FIG. 1, the link mechanism 950 includes a link 942 and a link 944. One end of the link 942 is connected to the mass 902 via an axle 922, and is free to rotate about the axle 922 relative to the mass 902. Also, the other end of the link 942 is connected to one end of the link 944 via an axle 924, and is free to rotate about the axle 924 relative to the link 944. An other end part P9 of the link 944 is in contact with the floor.

According to the support apparatus 90 illustrated in FIG. 1, a floor reaction force F is produced due to the torque output from the drive motor being transmitted to the link mechanism 950. Specifically, a floor reaction force F equal in magnitude to the gravitational force produced by the mass of the mass 902 acts on the other end part P9 of the link 944. With this arrangement, the mass of the mass 902 can be supported. Also, with regard to the attitude of the link mechanism 950, in each link, an attitude that preserves the equilibrium of imparted moments is maintained.

Herein, the link 942 and the link 944 have link lengths L which are equal to each other in length. Specifically, each of the distance between the axle 922 and the axle 924, as well as the distance between the axle 924 and the other end part P9 of the link 944, is the link length L. Also, the link mechanism 950 is configured to be extendable and contractable, such that the axle 922 is positioned above the other end part P9 of the link 944 in the vertical direction. Therefore, as illustrated in FIG. 1, the inclination angles θ9 with respect to the link 942 and the link 944 are equal to each other. In this case, a torque r about each axle produced for each link is expressed by the following Formula (1). Note that the inclination angle θ9 may take a value from 0° to 90°.

[Math. 1]

$$\tau = FL \sin \theta_9 \quad (1)$$

According to Formula (1), the torque r becomes smaller as the inclination angle θ9 approaches 0°, and becomes larger as the inclination angle θ9 approaches 90°. In other words, the demanded value of the torque of the motive power transmitted to the link mechanism 950 becomes smaller as the link mechanism 950 extends, and becomes larger as the link mechanism 950 contracts. In this way, in the support apparatus 90, the demanded value of the torque of the motive power transmitted to the link mechanism 950 may be different depending on the attitude of the support apparatus 90. Also, in the support apparatus 90 provided with the link mechanism 950, the demanded value of the rotation rate of the motive power transmitted to the link mechanism 950 also may be different depending on the attitude of the support apparatus 90. Specifically, the demanded value of the rotation rate of the motive power transmitted to the link mechanism 950 may be set larger as the link mechanism 950 extends.

Herein, in the case of using a drive motor capable of outputting a motive power satisfying the demanded values of both the rotation rate and the torque for each attitude of the support apparatus 90, the drive motor may become bulky. Accordingly, by providing the support apparatus 90 with a variable speed mechanism having a variable reduction ratio according to the properties of the above demanded values of the rotation rate and the torque, the apparatus can be miniaturized by preventing increased bulk of the drive motor associated with increasing the output of the drive motor. However, with such a variable speed mechanism, space to accommodate a mechanism for switching the reduction ratio may be necessary in some cases.

Herein, in a pair of rotating bodies having a variable reduction ratio, there are fewer component parts compared to other variable speed mechanisms. Accordingly, by applying a pair of rotating bodies having a variable reduction ratio as the variable speed mechanism of the support apparatus, more effective miniaturization of the apparatus is anticipated. Hereinafter, a setup for miniaturizing the support apparatus more effectively by utilizing a pair of rotating bodies having a variable reduction ratio will be described.

2. OVERVIEW OF PRESENT TECHNOLOGY

Next, before describing a support apparatus according to an embodiment of the present disclosure in detail, an overview of the present technology will be described with reference to FIGS. 2 to 13.

[2-1. Diagrammatic Configuration of Support Apparatus]

Figure 2:
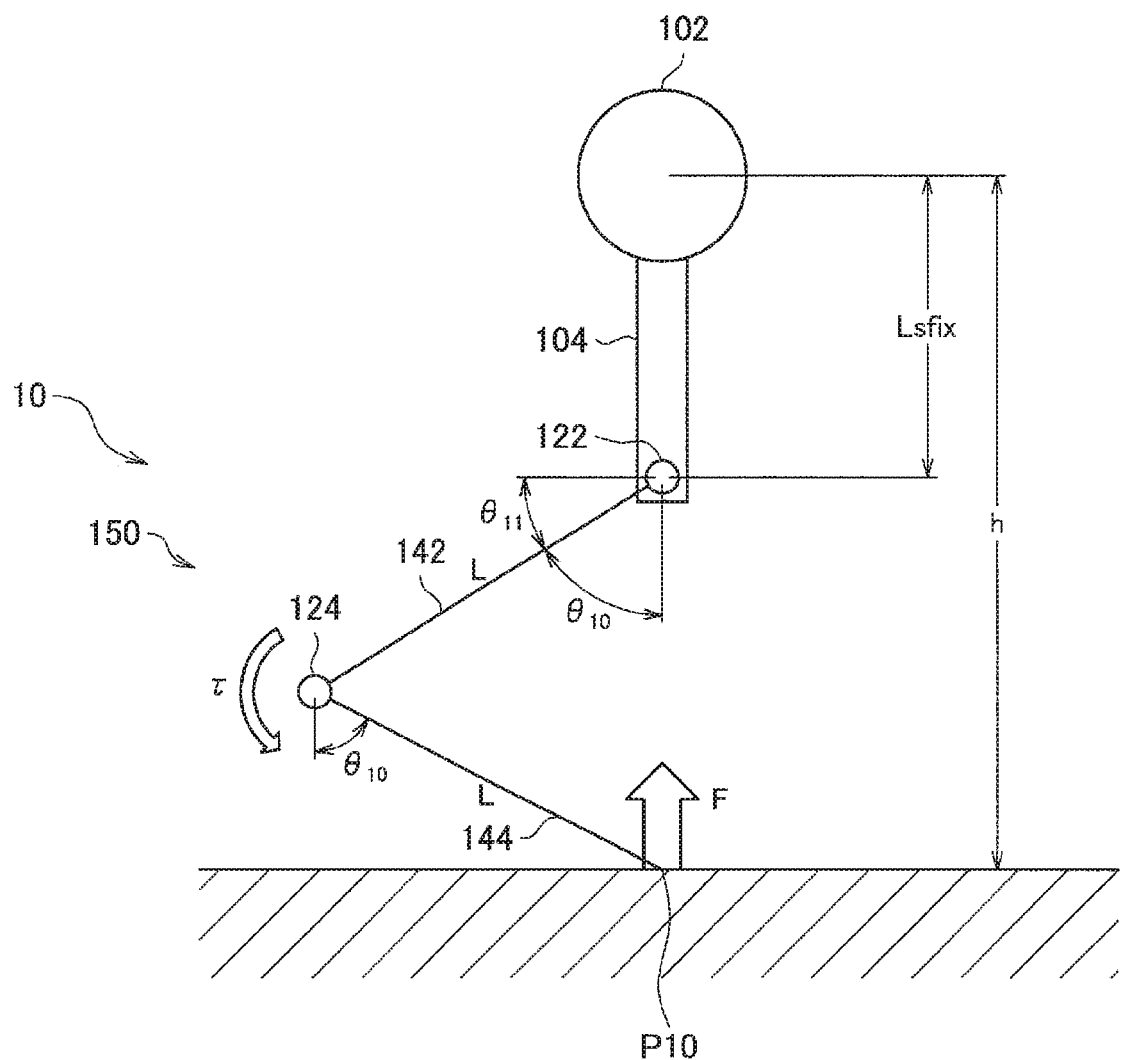
FIG. 2 is a schematic depiction illustrating an example of a diagrammatic configuration of a support apparatus different from the example illustrated in FIG. 1.
Figure 3:
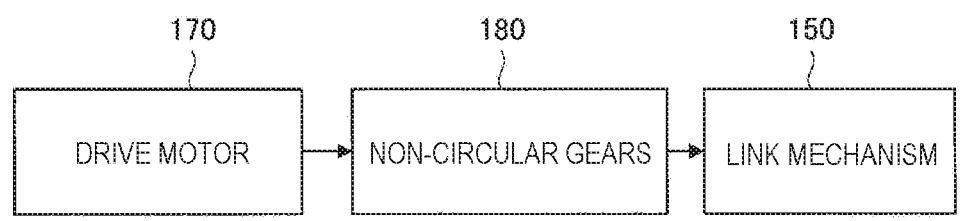
FIG. 3 is an explanatory diagram for explaining a transmission pathway of motive power in the support apparatus illustrated in FIG. 2.

First, a diagrammatic configuration of a support apparatus 10 will be described with reference to FIGS. 2 to 4. FIG. 2 is a schematic depiction illustrating an example of a diagrammatic configuration of the support apparatus 10 different from the support apparatus 90 according to the example illustrated in FIG. 1. FIG. 2 illustrates a diagrammatic configuration of the support apparatus 10 that supports a mass 102. FIG. 3 is an explanatory diagram for explaining a transmission pathway of motive power in the support apparatus 10 illustrated in FIG. 2.

The support apparatus 10 is provided with a link mechanism 150, a connecting section 104, and a drive motor 170 illustrated in FIG. 3. The link mechanism 150 is configured such that by transmitting motive power output from the drive motor 170, the link mechanism 150 is extendable and contractable in response to the motive power. The support apparatus 10 may be provided with a control apparatus not illustrated, and may be configured such that the driving of the drive motor 170 is controlled on the basis of a movement instruction output from the control apparatus, for example.

As illustrated in FIG. 2, the connecting section 104 is connected to the mass 102 on one end, and is connected to one end of a link 142 of the link mechanism 150 via an axle 122 on the other end. The connecting section 104 is affixed to the mass 102, and is able to move in the vertical direction as one with the mass 102.

As illustrated in FIG. 2, the link mechanism 150 includes the link 142 and a link 144. One end of the link 142 is connected to the connecting section 104 via the axle 122, and is free to rotate about the axle 122 relative to the connecting section 104. Also, the other end of the link 142 is connected to one end of the link 144 via an axle 124, and is free to rotate about the axle 124 relative to the link 144. An other end part P10 of the link 144 is in contact with the floor.

According to the support apparatus 10 illustrated in FIG. 2, a floor reaction force F is produced due to the torque output from the drive motor 170 being transmitted to the link mechanism 150. Specifically, a floor reaction force F equal in magnitude to the gravitational force produced by the mass of the mass 102 acts on the other end part P10 of the link 144. With this arrangement, the mass of the mass 102 can be supported. Also, with regard to the attitude of the link mechanism 150, in each link, an attitude that preserves the equilibrium of imparted moments is maintained.

Herein, the link 142 and the link 144 have link lengths L which are equal to each other in length. Specifically, each of the distance between the axle 122 and the axle 124, as well as the distance between the axle 124 and the other end part P10 of the link 144, is the link length L. Also, the link mechanism 150 is configured to be extendable and contractable, such that the axle 122 is positioned above the other end part P10 of the link 144 in the vertical direction. Therefore, as illustrated in FIG. 2, the inclination angles θ10 with respect to the link 142 and the link 144 are equal to each other.

Furthermore, the support apparatus 10 is provided with a pair of non-circular gears 180 as a variable speed mechanism. In the support apparatus 10, as illustrated in FIG. 3, the motive power output from the drive motor 170 is output to the link mechanism 150 via the pair of non-circular gears 180. The pair of non-circular gears 180 is an example of a pair of rotating bodies that act as a variable speed mechanism to output the motive power output from the drive motor 170 to the link mechanism 150 by a reduction ratio according to the attitude of the link mechanism 150. Specifically, the pair of non-circular gears 180 is a pair of spur gears, each having a non-circular pitch curve.

Figure 4:
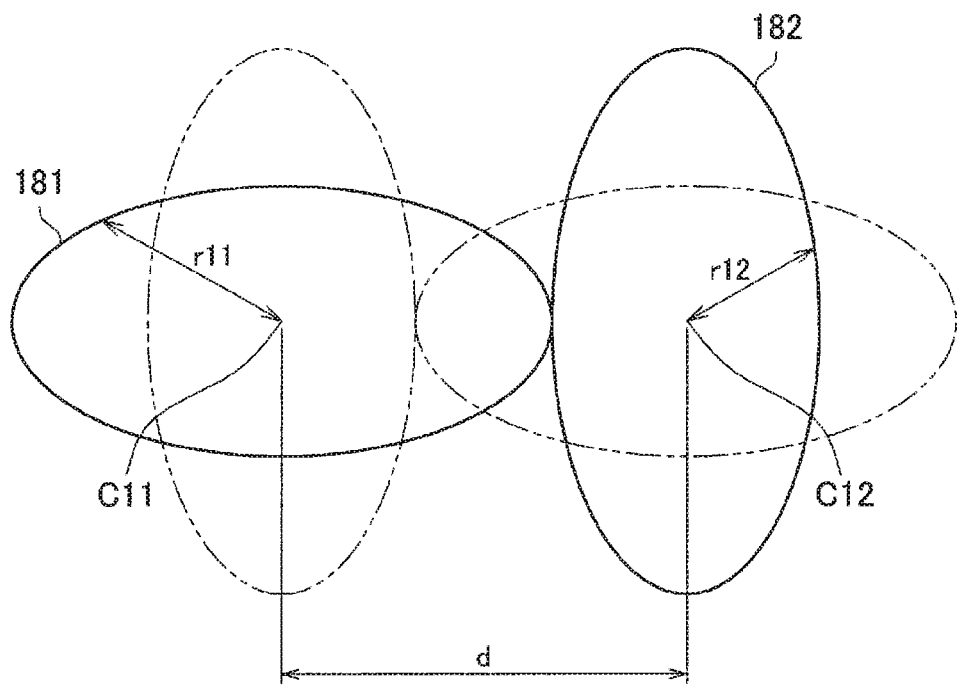
FIG. 4 is a schematic depiction illustrating an example of the pitch curves of a pair of non-circular gears.

FIG. 4 is a schematic depiction illustrating an example of the pitch curves of the pair of non-circular gears 180. The pair of non-circular gears 180 is provided with an input gear 182, which is the rotating body on the input side where motive power is input from the drive motor 170 side, and an output gear 181, which is the rotating body on the output side. The input gear 182 and the output gear 181 engage with each other while maintaining a constant distance d between respective centers of rotation C12 and C11. Note that in the following, the pair of non-circular gears 180 will also be simply designated the non-circular gears 180.

Herein, the reduction ratio of the non-circular gears 180 is expressed by the ratio of the pitch curve radius r11 of the output gear 181 with respect to the pitch curve radius r12 of the input gear 182 in the portion where the input gear 182 and the output gear 181 engage with each other. For the non-circular gears 180, unlike circular gears, the shape of the pitch curve of each gear is non-circular. Therefore, the pitch curve radiuses r12 and r11 in the portion where each gear engages with the other may change as each gear rotates. For example, in the state illustrated by the solid lines in FIG. 4, the pitch curve radius r12 in the portion where each gear engages with the other is short compared to the state illustrated by the two-dot chain lines. On the other hand, in the state illustrated by the solid lines in FIG. 4, the pitch curve radius r11 in the portion where each gear engages with the other is long compared to the state illustrated by the two-dot chain lines. Therefore, in the state illustrated by the solid lines in FIG. 4, the reduction ratio of the non-circular gears 180 is large compared to the state illustrated by the two-dot chain lines.

In this way, the non-circular gears 180 have a variable reduction ratio. In the support apparatus 10, each gear of the non-circular gears 180 has a rotation angle corresponding to the attitude of the link mechanism 150. In the following, as one example of the correspondence relationship between the rotation angle of each gear of the non-circular gears 180 and the attitude of the link mechanism 150, as illustrated in FIG. 2, an example will be described in which the sum of a rotation angle θ11 of the output gear 181 and the inclination angle θ10 of the link 142 and link 144 is 90°.

[2-2. Reduction Ratio of Non-Circular Gears]

Next, FIGS. 5 to 9 will be referenced to describe the reduction ratio of the non-circular gears 180 in detail. The inventor applied multiple creative innovations to the properties of the reduction ratio of the non-circular gears 180 with respect to the rotation angle of the input gear 182, and as a result, made it possible to miniaturize the support apparatus 10 more effectively.

The output gear 181 has a rotation angle θ11 corresponding to a rotation angle θ12 of the input gear 182. Therefore, the relationship between the rotation angle θ11 of the output gear 181 and the rotation angle θ12 of the input gear 182 is expressed using a function f according to Formula (2) below.

[Math. 2]

$$\theta_{11} = f(\theta_{12}) \tag{2}$$

The function f in Formula (2) stipulates the relationship between the rotation angle θ11 of the output gear 181 and the rotation angle θ12 of the input gear 182. Herein, the properties of the reduction ratio N of the non-circular gears 180 depend on the relationship between the rotation angle θ11 and the rotation angle θ12. Therefore, by stipulating the relationship between the rotation angle θ1 and the rotation angle θ2, the properties of the reduction ratio N can be set. Specifically, by appropriately setting the function f, the relationship between the rotation angle θ11 and the rotation angle θ12 can be stipulated such that the reduction ratio N has the desired properties. Hereinafter, an example will be described in which the function f expressed by Formula (3) below is applied as the function f in Formula (2).

[Math. 3]

$$f(x) = \sin^{-1}(Kx) \tag{3}$$

By applying the function f expressed by Formula (3), Formula (2) is converted to Formula (4) below.

[Math. 4]

$$\theta_{11} = \sin^{-1}(K\theta_{12}) \tag{4}$$

Also, Formula (5) below is derived by rearranging Formula (4). Note that K in Formula (5) is a constant.

[Math. 5]

$$K\theta_{12} = \sin\theta_{11} \tag{5}$$

The constant K in Formula (5) may be set such that the range that the rotation angle θ11 corresponding to the rotation angle θ12 may take becomes a desired range, for example. As an example, in the following, a case will be described in which the range that the rotation angle θ12 may take is from 0 to 2π, and the constant K is set such that the range that the rotation angle θ11 may take with respect to such a rotation angle θ12 is from 0 to π/2.

For example, assume that the rotation angle θ11 of the output gear 181 is 0 when the rotation angle θ12 of the input gear 182 is 0, and that the rotation angle θ11 of the output gear 181 is π/2 when the rotation angle θ12 of the input gear 182 is 2π. In Formula (5), by substituting in 2π and π/2 for the rotation angle θ12 and the rotation angle θ11, respectively, the following Formula (6) is derived.

[Math. 6]

$$2\pi K = \sin\left(\frac{\pi}{2}\right) \tag{6}$$

Also, Formula (7) below is derived by rearranging Formula (6).

[Math. 7]

$$K = \frac{1}{2\pi} \tag{7}$$

In this way, the constant K is set to ½π, for example.

Herein, in the portion where the input gear 182 and the output gear 181 engage with each other illustrated schematically in FIG. 4, since the speeds in the tangent direction are equal to each other for each of the gears, the following Formula (8) holds.

[Math. 8]

$$r_{11}\dot{\theta}_{11} = r_{12}\dot{\theta}_{12} \tag{8}$$

Also, as described above, the distance d between the center of rotation C12 of the input gear 182 and the center of rotation C11 of the output gear 181 takes a constant value, and is expressed by the following Formula (9).

[Math. 9]

$$r_{11} + r_{12} = d \tag{9}$$

At this point, the following Formula (10) is derived by taking the time derivative of both sides of Formula (5).

[Math. 10]

$$K\dot{\theta}_{12} = \dot{\theta}_{11}\cos\theta_{11} \tag{10}$$

Also, the following Formula (11) is derived by solving the simultaneous equations of Formula (8) and Formula (9), and eliminating r12.

[Math. 11]

$$r_{11}\dot{\theta}_{11} = (d - r_{11})\dot{\theta}_{12} \tag{11}$$

Herein, the following Formula (12) is derived by solving the simultaneous equations of Formula (10) and Formula (11), and eliminating $\dot{\theta}_{11}$ and $\dot{\theta}_{12}$.

[Math. 12]

$$r_{11} = d\left(1 - \frac{K}{K + \cos\theta_{11}}\right) \tag{12}$$

Also, the following Formula (13) is derived by substituting Formula (12) into Formula (9) and solving the equation.

[Math. 13]

$$r_{12} = \frac{dK}{K + \cos\theta_{11}} \tag{13}$$

Therefore, the reduction ratio N of the non-circular gears 180 is expressed by the following Formula (14).

[Math. 14]

$$N = \frac{r_{11}}{r_{12}} = \frac{\cos\theta_{11}}{K} \tag{14}$$

As described above, Formula (12) and Formula (13), which express the pitch curve radius r11 and the pitch curve radius r12, respectively, are derived on the basis of Formula (5), which expresses the relationship between the rotation angle θ11 of the output gear 181 and the rotation angle θ12 of the input gear 182. The relationship between the rotation angle θ11 of the output gear 181 and the rotation angle θ12 of the input gear 182 expressed by Formula (5) depends on the function f in Formula (2). Therefore, the properties of the reduction ratio N in the non-circular gears 180 depend on the function f in Formula (2).

Figure 5:
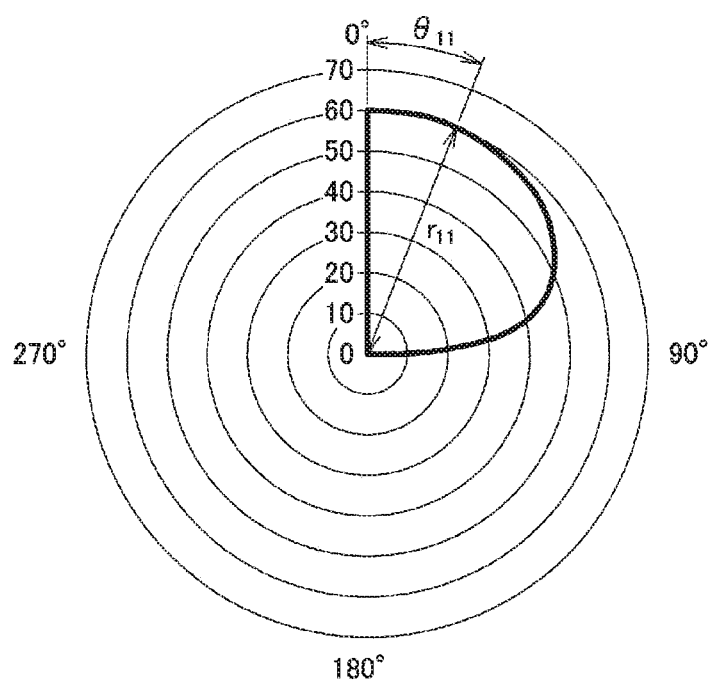
FIG. 5 is an explanatory diagram illustrating an example of the shape of a tooth on an output gear.
Figure 6:
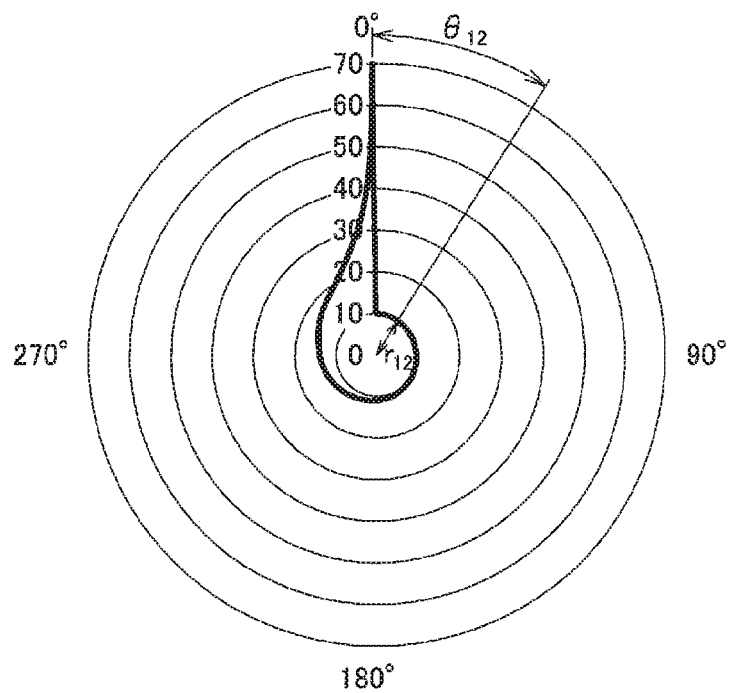
FIG. 6 is an explanatory diagram illustrating an example of the shape of a tooth on an input gear.

Herein, specific shapes of the output gear 181 and the input gear 182 corresponding to the pitch curve radius r11 and the pitch curve radius r12 expressed by Formula (12) and Formula (13), respectively, will be described. FIGS. 5 and 6 are explanatory diagrams illustrating an example of the shape of a tooth on the output gear 181 and the input gear 182, respectively. FIGS. 5 and 6 illustrate each of the pitch curves corresponding to the pitch curve radius r11 and the pitch curve radius r12 in the case of setting the distance d to 70 [mm].

Figure 7:
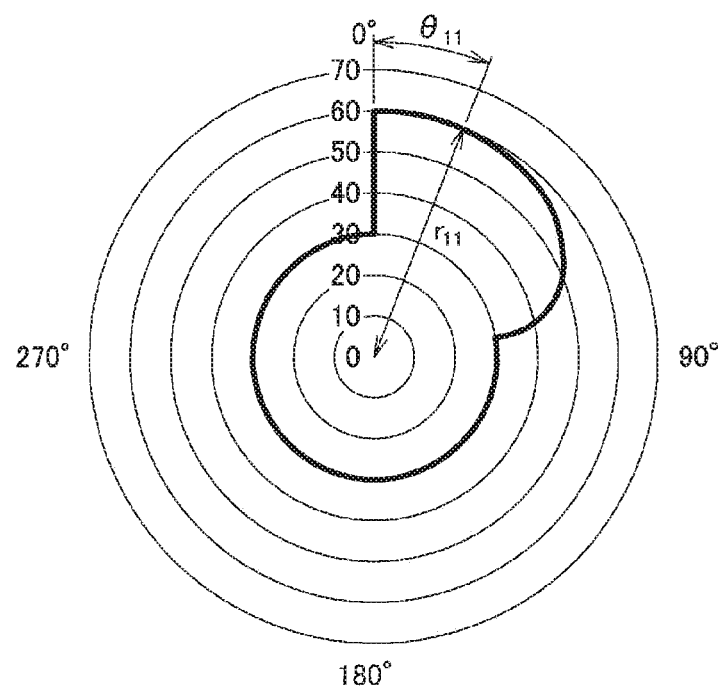
FIG. 7 is an explanatory diagram illustrating an example of the shape, including the attaching part, of the output gear.
Figure 8:
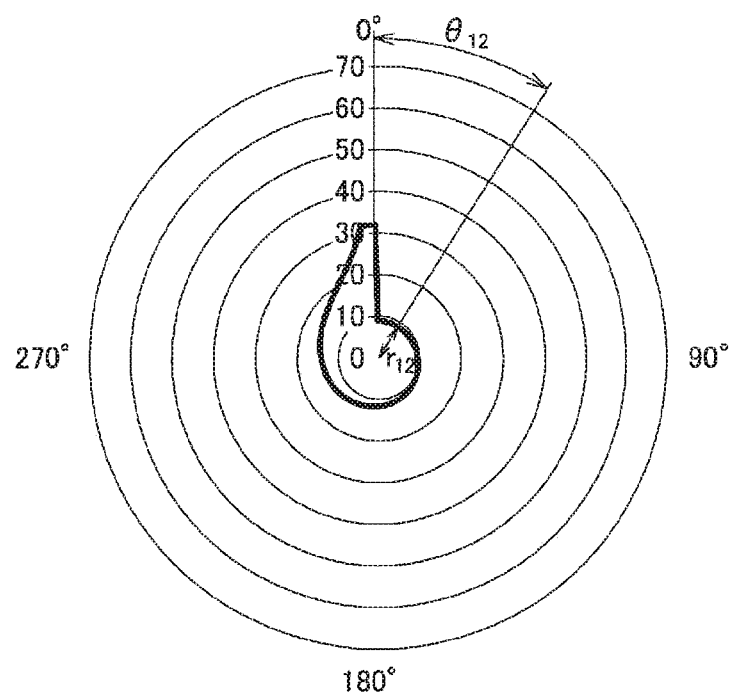
FIG. 8 is an explanatory diagram illustrating an example of the shape, including the attaching part, of the input gear.
Figure 9:
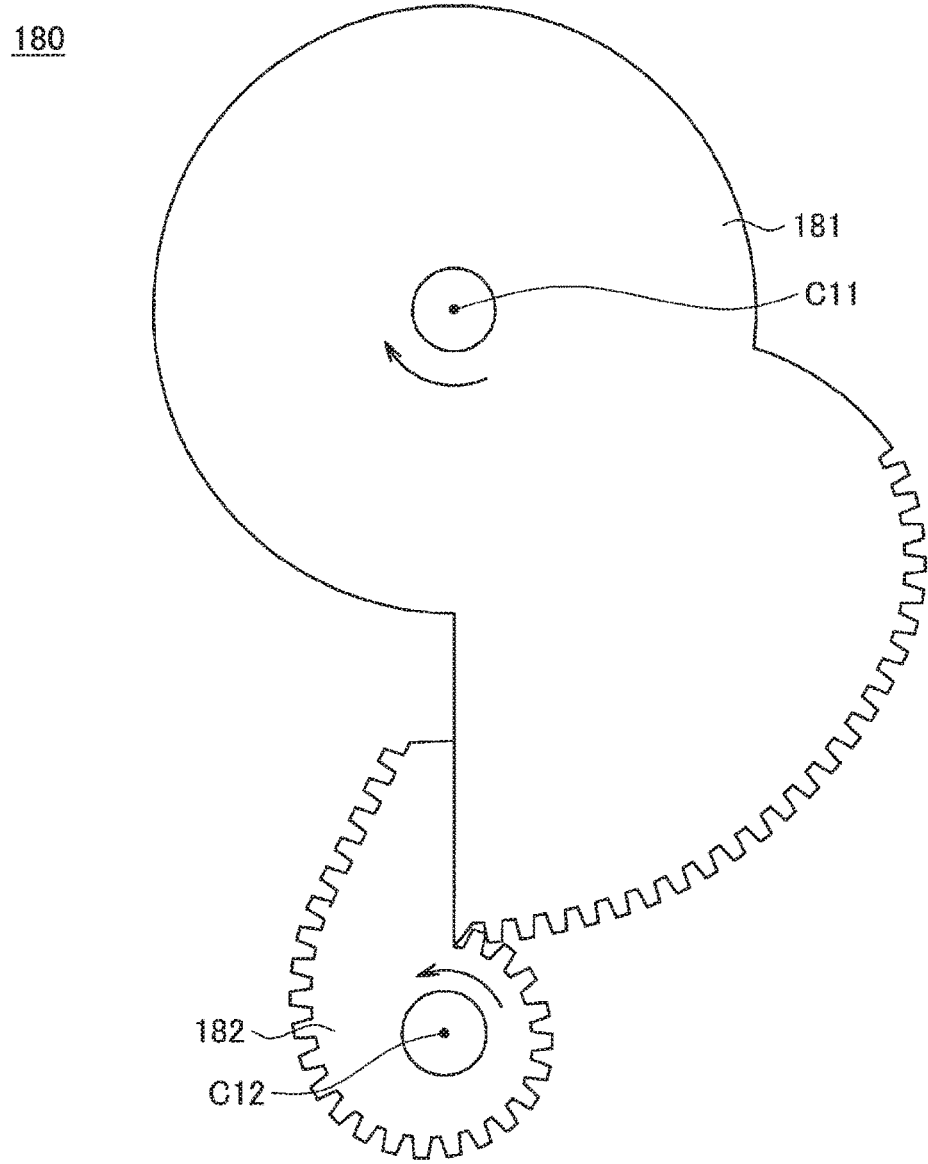
FIG. 9 is a diagrammatic view of the outward appearance of a pair of non-circular gears.

In the non-circular gears 180, each gear is provided rotatably about the center of rotation. Specifically, each gear is attached to another member of the apparatus via a rotating shaft. Therefore, in each gear, an attaching part for attaching the gear to the other member is formed. Also, the shape of each gear may be designed appropriately from the perspective of the simplicity of manufacturing and the stability of tooth engagement. The shapes of each of the gears designed appropriately in this way are illustrated in FIGS. 7 to 9. Specifically, FIGS. 7 and 8 are explanatory diagrams illustrating an example of the shape, including the attaching part, of the output gear 181 and the input gear 182, respectively. Note that in FIGS. 7 and 8, the teeth of each gear are represented by a pitch curve. Also, FIG. 9 is a diagrammatic view of the outward appearance of the pair of non-circular gears 180.

[2-3. Output Properties of Drive Motor]

Next, the output properties of the drive motor 170 of the support apparatus 10 according to the present technology will be described in detail.

First, the properties of the output torque τm of the drive motor 170 will be described.

In the support apparatus 10, a torque r about each axle produced for each link is expressed by the following Formula (15). Note that the inclination angle θ10 may take a value from 0° to 90°.

[Math. 15]

$$\tau = FL \sin \theta_{10} \tag{15}$$

In the support apparatus 10, since the pair of non-circular gears 180 having a variable reduction ratio N is used as a variable speed mechanism, the output torque τm of the drive motor 170 required to produce the torque r expressed by Formula (15) is expressed by the following Formula (16).

[Math. 16]

$$\tau_m = \frac{\tau}{N} = \frac{FL \sin \theta_{10}}{N} \tag{16}$$

According to Formula (15), the torque r becomes larger as the inclination angle θ10 approaches 90°. In other words, the demanded value of the torque of the motive power transmitted to the link mechanism 150 becomes larger as the link mechanism 150 contracts. Herein, as illustrated in Formula (16), the output torque τm of the drive motor 170 is inversely proportional to the reduction ratio N of the non-circular gears 180. Also, according to Formula (14), the reduction ratio N becomes larger as the rotation angle θ11 of the output gear 181 approaches 0°. In other words, the reduction ratio N becomes larger as the link mechanism 150 contracts. Therefore, even in the case in which the link mechanism 150 takes a relatively contracted attitude, an increase in the output torque m of the drive motor 170 can be prevented.

Figure 10:
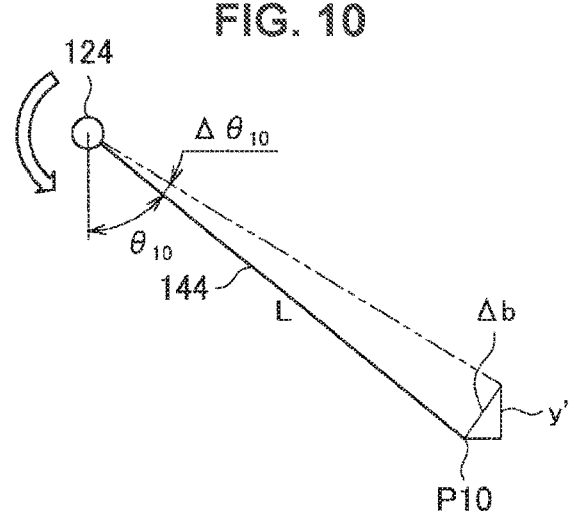
FIG. 10 is an explanatory diagram for explaining the relationship between the rotation rate of a drive motor and the extension-contraction speed in the vertical direction of the support apparatus.

Next, FIG. 10 will be referenced to describe the properties of the rotation rate n of the drive motor 170. FIG. 10 is an explanatory diagram for explaining the relationship between the rotation rate n of the drive motor 170 and the extension-contraction speed in the vertical direction of the support apparatus 10. Specifically, FIG. 10 illustrates how the link 144 rotates by an infinitesimal angle Δθ10 about the axle 124.

If the number of revolutions per minute of the drive motor 170 is taken to be the rotation rate n [rpm], and the link 144 is taken to rotate by just the infinitesimal angle Δθ10 in one second about the axle 124, then the infinitesimal angle Δθ10 is expressed by the following Formula (17).

[Math. 17]

$$\Delta\theta_{10} = 2\pi \times \frac{n}{60} \times \frac{1}{N} \tag{17}$$

Therefore, the movement distance Δd in 1 second of the other end part P10 of the link 144 is expressed by the following Formula (18).

[Math. 18]

$$d = 2\pi L \times \frac{n}{60} \times \frac{1}{N} \tag{18}$$

Therefore, vertical direction component y' of the movement distance Δd in 1 second of the other end part P10 of the link 144 is expressed by the following Formula (19).

[Math. 19]

$$y' = 2\pi L \times \frac{n}{60} \times \frac{1}{N} \sin\theta_{10} \tag{19}$$

Also, Formula (20) below is derived by rearranging Formula (19).

[Math. 20]

$$n = \frac{\left(\frac{30N}{L\pi}\right) y'}{\sin \theta_{10}} \tag{20}$$

The extension-contraction direction of the link mechanism 150 is approximately aligned with the vertical direction. Therefore, the vertical direction component y' of the movement distance Δd in Formula (20) is correlated with the extension-contraction speed of the link mechanism 150. Also, in some cases, the demanded value of the extension-contraction speed of the link mechanism 150 is set larger as the link mechanism 150 extends. Herein, as illustrated in Formula (20), the rotation rate n of the drive motor 170 is proportional to the reduction ratio N of the non-circular gears 180. Also, according to Formula (14), the reduction ratio N becomes smaller as the rotation angle θ11 of the output gear 181 approaches 90°. In other words, the reduction ratio N becomes smaller as the link mechanism 150 extends. Therefore, even in the case in which the link mechanism 150 takes a relatively extended attitude, an increase in the rotation rate n of the drive motor 170 can be prevented.

Figure 11:
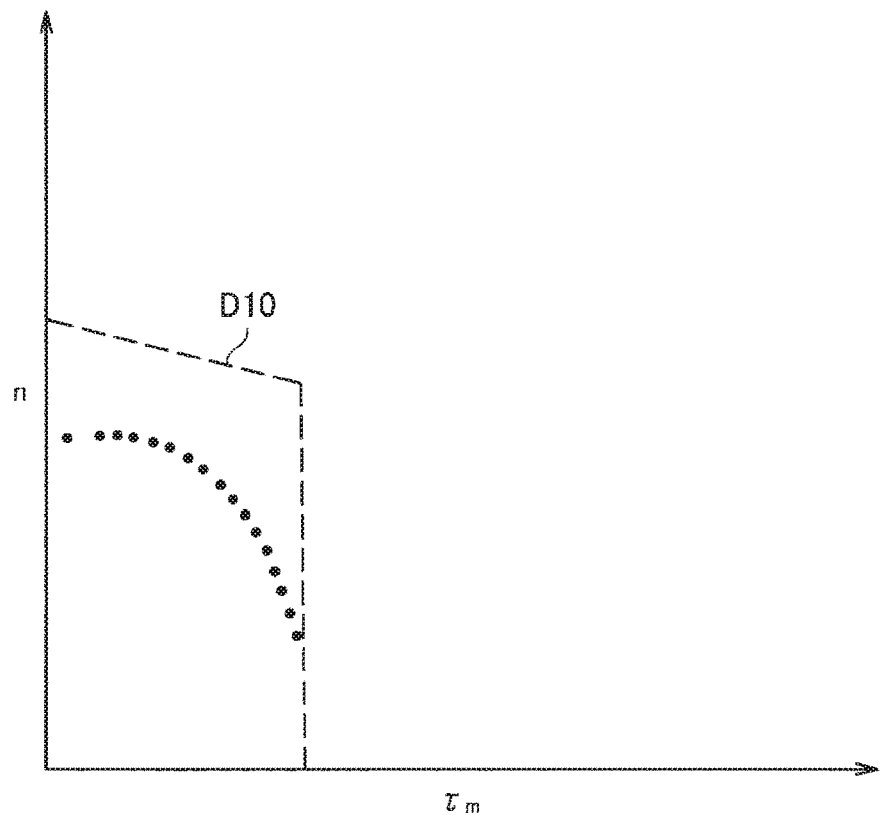
FIG. 11 is an explanatory diagram illustrating an example of the output properties of a drive motor in a support apparatus using non-circular gears as a variable speed mechanism.

At this point, the output properties of the drive motor 170 in the support apparatus 10 utilizing the non-circular gears 180 described above as a variable speed mechanism will be described conceptually. FIG. 11 is an explanatory diagram illustrating an example of the output properties of the drive motor 170 in the support apparatus 10 utilizing the non-circular gears 180 described above as a variable speed mechanism. In FIG. 11, the horizontal axis indicates the output torque τm, and the vertical axis indicates the rotation rate n. In FIG. 11, pairs of the output torque τm and the rotation rate n of the drive motor 170 for each attitude of the link mechanism 150 are illustrated schematically by dots.

Specifically, in FIG. 11, results of computing the output torque τm and the rotation rate n of the drive motor 170 for respective inclination angles θ10 using Formula (16) and Formula (20) are illustrated by dots. More specifically, in the computation of the output properties of the drive motor 170, calculation was performed by taking the floor reaction force F to be 8.0 [kgf] and the length L of each link to be 0.12 [m]. Also, the above calculation was performed additionally for an example in which circular gears with a reduction ratio of 4 are provided between the drive motor 170 and the link mechanism 150. Also, in the non-circular gears 180, the rotatable angle of the output gear 181 is taken to be from 0° to approximately 80°, and thus the reduction ratio of the non-circular gears 180 takes a value from 1 to $2\pi$. In addition, the above calculation was performed with the power transmission efficiency taken to be 90% in the above circular gears and the non-circular gears 180. Therefore, in the case of taking the above circular gears and the non-circular gears 180 as a single variable speed mechanism, the reduction ratio of the variable speed mechanism may take a value from 3.24 to 20.36.

In the present technology, as described above, the support apparatus 10 is provided with a pair of non-circular gears 180 that output the motive power output from the drive motor 170 to the link mechanism 150 by a reduction ratio N according to the attitude of the link mechanism 150. With this arrangement, even in the case in which the link mechanism 150 takes a relatively contracted attitude, an increase in the output torque τm of the drive motor 170 can be prevented. Also, even in the case in which the link mechanism 150 takes a relatively extended attitude, an increase in the rotation rate n of the drive motor 170 can be prevented. Therefore, as illustrated in FIG. 11, in the support apparatus 10 that utilizes the non-circular gears 180 as a variable speed mechanism, for each attitude of the link mechanism 150, the pair of the output torque τm and the rotation rate n of the drive motor 170 is contained inside a continuous running availability area D10, which indicates a region in which continuous output is possible. Note that in FIGS. 11 to 13, a dashed line is used to illustrate the continuous running availability area D10 that indicates the range of a predetermined output torque τm or less and a predetermined rotation rate n or less.

Figure 12:
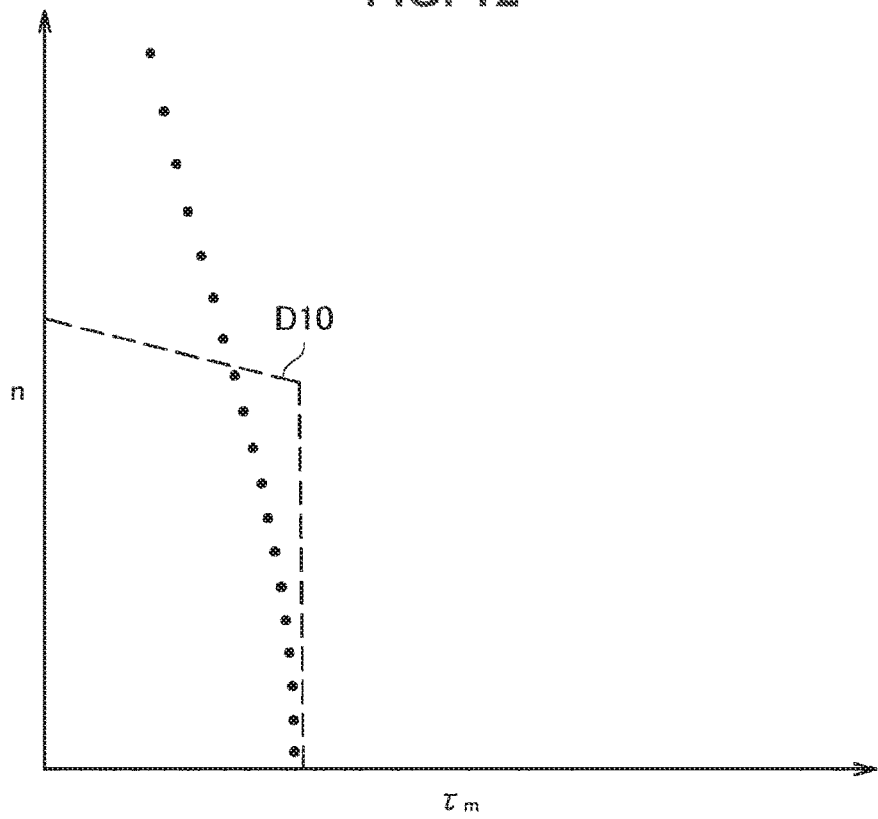
FIG. 12 is an explanatory diagram illustrating an example of the output properties of a drive motor in a support apparatus using circular gears as a variable speed mechanism.
Figure 13:
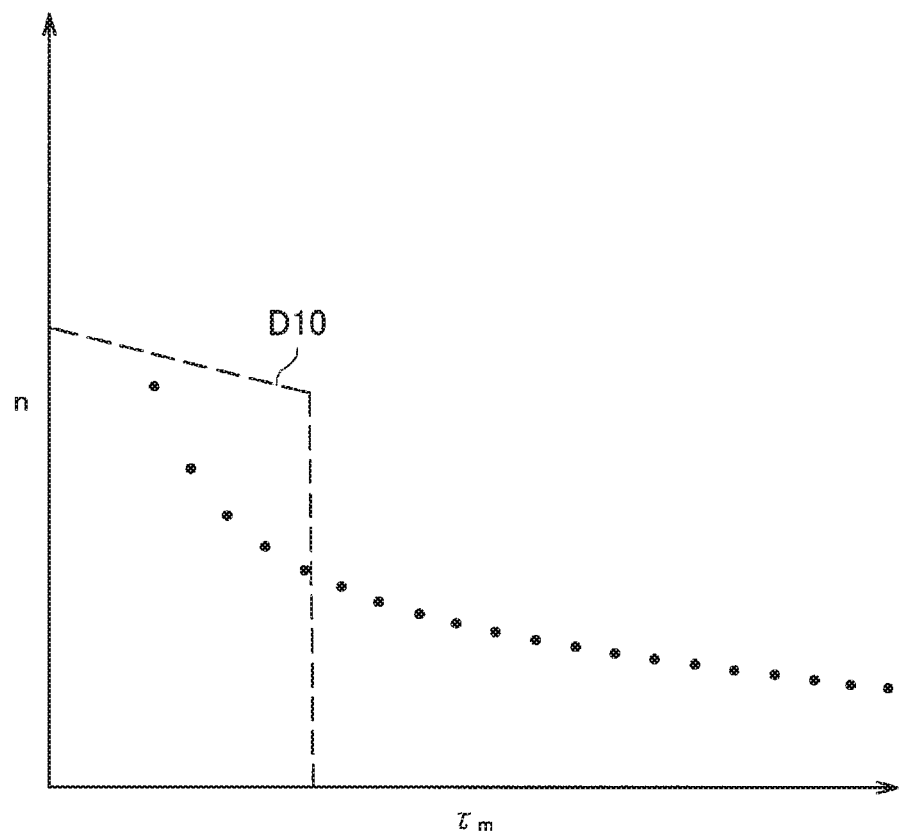
FIG. 13 is an explanatory diagram illustrating an example of the output properties of a drive motor in a support apparatus using circular gears as a variable speed mechanism.

On the other hand, FIGS. 12 and 13 are explanatory diagrams illustrating examples of the output properties of a drive motor in a support apparatus according to a reference example that utilizes circular gears as a variable speed mechanism. In the support apparatus according to the reference example illustrated in FIGS. 12 and 13, if non-circular gears are not used, motive power is transmitted from the drive motor to the link mechanism via circular gears having a fixed reduction ratio. Specifically, FIG. 12 illustrates an example in which circular gears with a reduction ratio of 23.8 are used. Also, FIG. 13 illustrates an example in which circular gears with a reduction ratio of 4 are used.

In the example corresponding to FIG. 12, since circular gears having a relatively high reduction ratio are used as a variable speed mechanism, even in the case in which the link mechanism takes a relatively contracted attitude, an increase in the output torque τm of the drive motor can be prevented. However, as illustrated in FIG. 12, in the case in which the link mechanism takes a relatively extended attitude, the increase in the rotation rate of the drive motor causes some of the pairs of the output torque τm and the rotation rate n of the drive motor to become positioned higher on the rotation rate side than the continuous running availability area D10.

In the example corresponding to FIG. 13, since circular gears having a relatively low reduction ratio are used as a variable speed mechanism, even in the case in which the link mechanism takes a relatively extended attitude, an increase in the rotation rate n of the drive motor can be prevented. However, as illustrated in FIG. 13, in the case in which the link mechanism takes a relatively contracted attitude, the increase in the output torque of the drive motor causes some of the pairs of the output torque τm and the rotation rate n of the drive motor to become positioned higher on the output torque side than the continuous running availability area D10.

In this way, in the present technology, the pair of non-circular gears 180 outputs motive power output from the drive motor 170 to the link mechanism 150 by a reduction ratio according to the attitude of the link mechanism 150. Specifically, the reduction ratio N of the non-circular gears 180 is set to become larger as the length in the extension-contraction direction of the link mechanism 150 becomes shorter. With this arrangement, in the support apparatus 10, a change in the reduction ratio according to the properties of the demanded values of the rotation rate and the torque of the motive power transmitted to the link mechanism 150 is achievable with a variable speed mechanism having relatively few component parts. Therefore, it is possible to miniaturize the apparatus more effectively.

Next, the relationship between the length in the extension-contraction direction of the link mechanism 150 and the rotation angle of the drive motor 170 will be described. As described above, in the support apparatus 10, the connecting section 104 and the mass 102 are movable in the vertical direction as one. For example, as illustrated in FIG. 2, the mass 102 is positioned vertically above the axle 122 with a fixed distance Lsfix in between. In this case, the distance h in the vertical direction from the portion of the support apparatus 10 in contact with the floor, namely the other end part P10 of the link 144, to the mass 102 is expressed by the following Formula (21).

[Math. 21]

$$h = 2L \cos \theta_{10} + Lsfix \quad (21)$$

As described above, since the sum of the rotation angle θ11 of the output gear 181 and the inclination angle θ10 of the link 142 and the link 144 is 90°, the following Formula (22) is derived from Formula (5) and Formula (21).

[Math. 22]

$$h = 2LK\theta_{12} + L\text{sfix} \quad (22)$$

Also, the following Formula (23) is derived by substituting Formula (7) into Formula (22).

[Math. 23]

$$h = \frac{L}{\pi}\theta_{12} + L\text{sfix} \quad (23)$$

Herein, the input gear 182 and the rotating shaft of the drive motor 170 may be coupled directly, or via one or more circular gears. In other words, the rotation angle of the drive motor 170 may also be correlated with the rotation angle θ12 of the input gear 182. According to Formula (23), the distance h in the vertical direction from the portion of the support apparatus 10 in contact with the floor, namely the other end part P10 of the link 144, to the mass 102 has a linear relationship with the rotation angle θ12 of the input gear 182. As described above, the link mechanism 150 is configured to be extendable and contractable, such that the axle 122 is positioned above the other end part P10 of the link 144 in the vertical direction. Therefore, the distance h in Formula (23) is correlated with the length in the extension-contraction direction of the link mechanism 150.

At this point, in fields related to support apparatus provided with a link mechanism that, by transmitting motive power output from a drive motor, is extendable and contractable in response to the motive power, it is conceivably desirable to reduce computational complexity in the drive control of the support apparatus. Specifically, in fields related to support apparatus, in the control of the drive motor, the length in the extension-contraction direction of the link mechanism or a value correlated with the length is expressed by the rotation angle of the drive motor in some cases. Therefore, in cases in which the length in the extension-contraction direction of the link mechanism has a non-linear relationship with the rotation angle of the drive motor, the computational complexity may increase in the control of the drive motor.

According to the present technology, as described above, the length in the extension-contraction direction of the link mechanism 150 may also have a linear relationship with the rotation angle of the drive motor 170. With this arrangement, formulas related to the control of the drive motor 170 in the support apparatus 10 can be simplified. Therefore, the computational complexity in the drive control of the support apparatus 10 can be reduced.

3. SUPPORT APPARATUS ACCORDING TO EMBODIMENT

Next, a support apparatus 1 according to an embodiment of the present disclosure will be described with reference to FIGS. 14 to 20.

[3-1. Overall Configuration of Support Apparatus]

Figure 14:
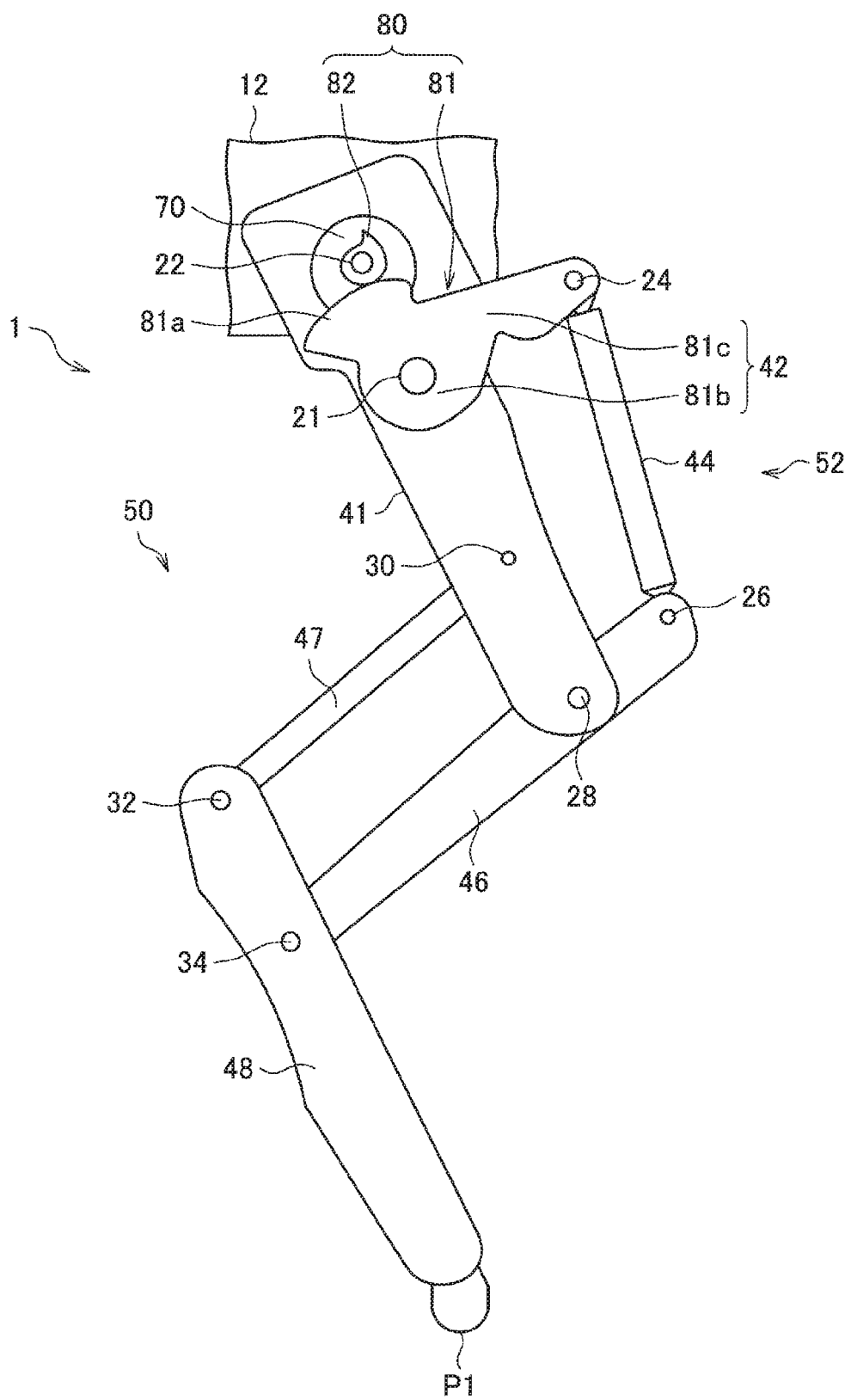
FIG. 14 is a schematic depiction illustrating an example of an overall configuration of the support apparatus according to an embodiment of the present disclosure.
Figure 15:
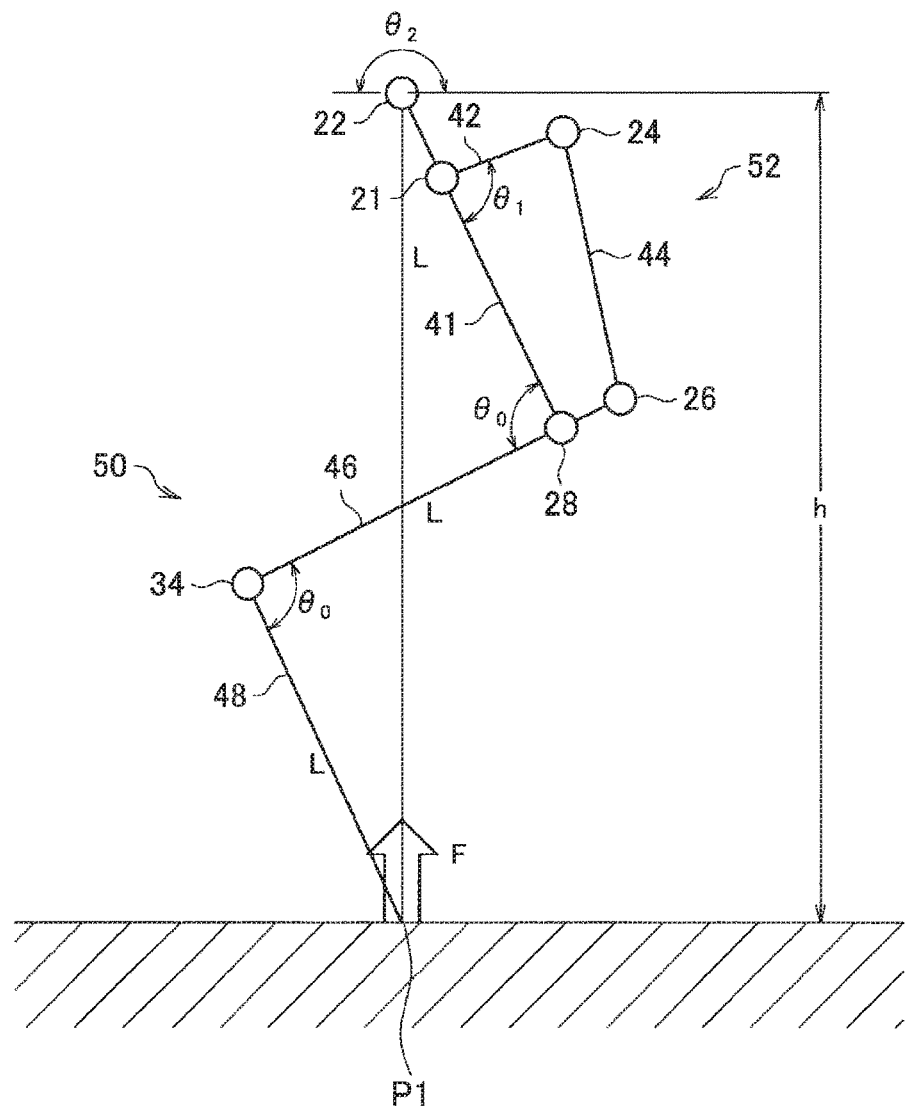
FIG. 15 is a schematic depiction illustrating a diagrammatic configuration of the support apparatus according to the present embodiment.

First, an overall configuration of the support apparatus 1 will be described with reference to FIGS. 14 and 15. FIG. 14 is a schematic depiction illustrating an example of an overall configuration of the support apparatus 1 according to the present embodiment FIG. 15 is a schematic depiction illustrating a diagrammatic configuration of the support apparatus 1 according to the present embodiment.

The support apparatus 1 according to the present embodiment may be used as a legged robot, for example. Specifically, FIG. 14 illustrates a support apparatus 1 that supports the main body of a robot. The relationship between the support apparatus 1 and the main body of the robot corresponds to the relationship between the support apparatus 10 and the mass 102 described with reference to FIG. 2. FIG. 14 illustrates an attaching part 12 to which the support apparatus 1 is attached in the main body of the robot.

The support apparatus 1 is provided with a link mechanism 50, a drive motor 70, and a pair of non-circular gears 80. The link mechanism 50 is configured such that by transmitting motive power output from the drive motor 70, the link mechanism 50 is extendable and contractable in response to the motive power. The support apparatus 1 may be provided with a control apparatus not illustrated, and may be configured such that the driving of the drive motor 70 is controlled on the basis of a movement instruction output from the control apparatus, for example. In the support apparatus 1, similarly to the transmission pathway of motive power in the support apparatus 10 described with reference to FIG. 3, motive power output from the drive motor 70 is output to the link mechanism 50 via the pair of non-circular gears 80.

The pair of non-circular gears 80 is an example of a pair of rotating bodies that act as a variable speed mechanism to output the motive power output from the drive motor 70 to the link mechanism 50 by a reduction ratio according to the attitude of the link mechanism 50. The pair of non-circular gears 80 is provided with an input gear 82 and an output gear 81. The input gear 82 and the rotating shaft of the drive motor 70 may be coupled directly, or via one or more circular gears. Specifically, in the pair of non-circular gears 80, by having a rotation angle θ1 of the output gear 81 be non-linear with respect to a rotation angle θ2 of the input gear 82, a change in the reduction ratio according to the attitude of the link mechanism 50 can be achieved. Details regarding the properties of the reduction ratio for such non-circular gears 80 will be described later. Note that in the following, the pair of non-circular gears 80 will also be simply designated the non-circular gears 80.

The link mechanism 50 includes multiple links. Specifically, as illustrated in FIG. 14, the link mechanism 50 includes a link 41, a link 42 which is part of the output gear 81, a link 44, a link 46, a link 47, and a link 48.

At least part of the link mechanism 50 according to the present embodiment forms a trapezoidal link mechanism 52. For example, in the support apparatus 1, the trapezoidal link mechanism 52 is formed by the link 41, the link 42, the link 44, and the link 46. The trapezoidal link mechanism 52 is a 4-joint link mechanism in which opposing links are of different link lengths. The link 42 corresponds to a first link according to the present disclosure. Also, the link 46 corresponds to a second link according to the present disclosure. Also, the link 41 and the link 44 correspond to a third link and a fourth link according to the present disclosure, respectively. According to the support apparatus 1 according to the present embodiment, by forming the trapezoidal link mechanism 52 as at least part of the link mechanism 50, limitations on the attitude of the support apparatus 1 can be minimized. Note that details about such a trapezoidal link mechanism 52 will be described later.

The pair of non-circular gears 80 and the drive motor 70 are provided on the link 41. Specifically, the input gear 82 and the drive motor 70 are provided on one end of the link

41. Also, the output gear 81 is provided closer to the middle than the input gear 82 in the extension direction of the link 41. The input gear 82 and the output gear 81 are connected to the link 41 through respective rotating shafts, and are free to rotate with respect to the link 41. The drive motor 70 is affixed to the link 41, for example. Also, the relative positions with respect to the link 41 of each of the rotating shafts of the pair of non-circular gears 80 are fixed. Specifically, the relative positions with respect to the link 41 of a rotating shaft 22 of the input gear 82 and a rotating shaft 21 of the output gear 81 are fixed.

The link 41 is rotatably attached on one end and free to rotate relative to the attaching part 12 of the main body of the robot. Specifically, the link 41 is free to rotate about the rotating shaft 22 of the input gear 82 relative to the attaching part 12 of the main body of the robot. Also, the link 41 is connected on the other end to a middle part of the link 46 and to one end of the link 47 via an axle 28 and an axle 30, respectively, and is free to rotate about each of the axle 28 and the axle 30 relative to the link 46 and the link 47. The axle 30 is positioned closer to the middle than the axle 28 in the extension direction of the link 41.

The link 42 corresponds to a first link on the input side which is rotatable under motive power input via the pair of non-circular gears 80. For example, in the present embodiment, the link 42 is included as part of the output gear 81. Specifically, the output gear 81 is provided with a tooth part 81a that engages with a tooth part of the input gear 82, an attaching part 81b connected to the link 41 through the rotating shaft 21, and a projecting part 81c that projects in the radial direction. The projecting part 81c is provided at a different location from the location where the tooth part 81a is provided in the circumferential direction of the output gear 81, and is connected to one end of the link 44 through an axle 24 on the front end thereof. The link 42 may include the attaching part 81b and the projecting part 81c. In this way, the link 42 may be rotatable as one with the output gear 81. Also, the link 42 is rotatable about the axle 24 relative to the link 44. Note that the link 42 does not have to be included as part of the output gear 81. In addition, the link 42 may include multiple members.

The link 46 corresponds to a second link on the output side which is disposed opposite the link 42, and which is rotatable in accordance with the rotation of the link 42. One end of the link 46 is connected to the other end of the link 44 via an axle 26, and is free to rotate about the axle 26 relative to the link 44. Also, the other end of the link 46 is connected to a middle part of the link 48 via an axle 34, and is free to rotate about the axle 34 relative to the link 48.

As described above, the link 41 and the link 44 respectively correspond to a third link and a fourth link that face opposite each other and rotatably couple the link 42 and the link 46.

The other end of the link 47 is connected to one end of the link 48 via an axle 32, and is free to rotate about the axle 32 relative to the link 48. Also, an other end part P1 of the link 48 is in contact with the floor.

In the present embodiment, a parallel link mechanism is formed by the link 41, the link 46, the link 47, and the link 48. Specifically, in the parallel link mechanism, the link lengths of the link 41 and the link 48 which face opposite each other are approximately the same. Specifically, the distance between the axle 30 and the axle 28 is approximately the same as the distance between the axle 32 and the axle 34. Also, in the parallel link mechanism, the link lengths of the link 46 and the link 47 which face opposite each other are approximately the same. Specifically, the distance between the axle 28 and the axle 34 is approximately the same as the distance between the axle 30 and the axle 32.

In FIG. 15, the configuration of the support apparatus 1 illustrated in FIG. 14 is illustrated more diagrammatically. Note that in FIG. 15, the attaching part 12 of the main body of the robot, the input gear 82, part of the output gear 81, and the link 47 are omitted from illustration. According to the support apparatus 1 illustrated in FIGS. 14 and 15, a floor reaction force F is produced due to the torque output from the drive motor 70 being transmitted to the link mechanism 50. Specifically, a floor reaction force F equal in magnitude to at least part of the gravitational force produced by the mass of the main body of the robot acts on the other end part P1 of the link 48. With this arrangement, at least part of the mass of the main body of the robot can be supported. Also, with regard to the attitude of the link mechanism 50, in each link, an attitude that preserves the equilibrium of imparted moments is maintained.

Herein, the distance between the rotating shaft 22 and the axle 28 in the link 41, the distance between the axle 28 and the axle 34 in the link 46, and the distance between the axle 34 and the other end part P1 in the link 48 have an equal link length L. Also, the link mechanism 50 is configured to be extendable and contractable, such that the rotating shaft 22 is positioned above the other end part P1 of the link 48 in the vertical direction. Also, in the support apparatus 1, as described with reference to FIG. 14, a parallel link mechanism is formed by the link 41, the link 46, the link 47, and the link 48. Therefore, as illustrated in FIG. 15, the angle obtained between the link 41 and the link 46 as well as the angle obtained between the link 46 and the link 48 become an opening angle θ0 of equal magnitude. Also, the distance h in the vertical direction from the portion of the support apparatus 1 in contact with the floor, namely the other end part P1 of the link 48, to the rotating shaft 22 is expressed by the following Formula (24). Note that the opening angle θ0 may take a value from 0° to 180°.

[Math. 24]

$$h = L\sqrt{8\sin^2\frac{\theta_0}{2} + 1} \tag{24}$$

As described above, the link 41 is attached to be free to rotate relative to the attaching part 12 of the main body of the robot, and is also free to rotate about the rotating shaft 22. Also, the link mechanism 50 is configured to be extendable and contractable, such that the rotating shaft 22 is positioned above the other end part P1 of the link 48 in the vertical direction. Therefore, the distance h expressed by Formula (24) corresponds to the length in the extension-contraction direction of the link mechanism 50.

[3-2. Trapezoidal Link Mechanism]

Figure 16:
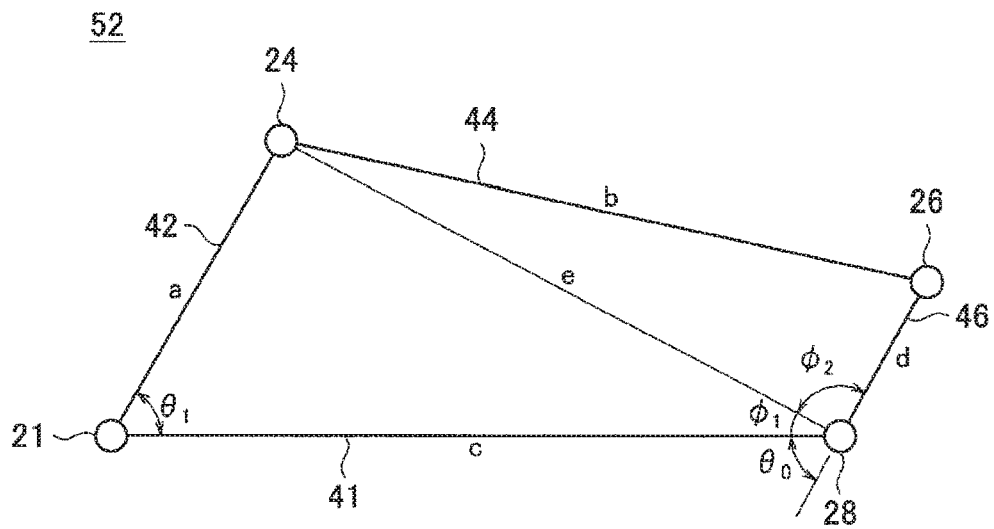
FIG. 16 is a schematic depiction illustrating an example of a trapezoidal link mechanism according to the present embodiment.
Figure 17:
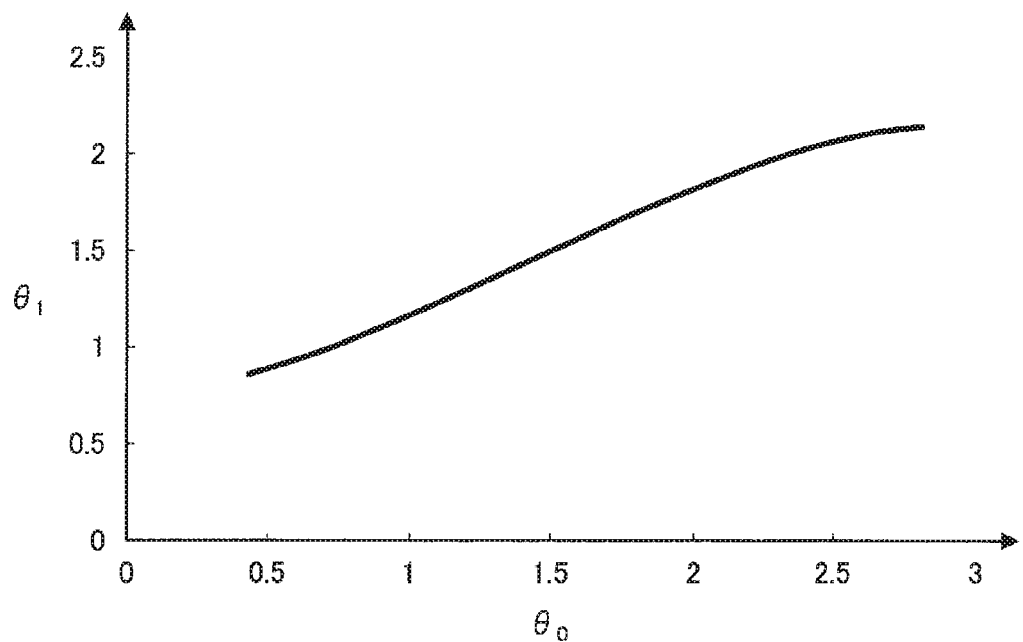
FIG. 17 is an explanatory diagram illustrating an example of the relationship between an opening angle of the link mechanism and a rotation angle of the output gear according to the present embodiment.

Next, FIGS. 16 and 17 will be referenced to describe the details of the trapezoidal link mechanism 52 according to the present embodiment. FIG. 16 is a schematic depiction illustrating an example of the trapezoidal link mechanism 52 according to the present embodiment. As illustrated in FIG. 16, in the trapezoidal link mechanism 52, the distance between the rotating shaft 21 and the axle 24 corresponds to a link length a of the first link corresponding to the link 42, the distance between the axle 24 and the axle 26 corresponds to a link length b of the fourth link corresponding to the link 44, the distance between the rotating shaft 21 and the axle 28 corresponds to a link length c of the third link corresponding to the link 41, and the distance between the axle 26 and the axle 28 corresponds to the link length a of the second link corresponding to the link 46.

In the following, as illustrated in FIG. 16, the distance between the axle 24 and the axle 28 is designated the length e, the angle obtained between the line connecting the axle 24 to the axle 28 and the link 41 is designated the angle φ1, and the angle obtained between the line connecting the axle 24 to the axle 28 and the link 46 is designated the angle φ2. Therefore, as illustrated in FIG. 16, the opening angle θ0 described with reference to FIG. 15 becomes the angle obtained by subtracting the angle φ1 and the angle φ2 from 180°. Also, in the following, as illustrated in FIG. 16, the angle obtained between the link 42 and the link 41 is described as the rotation angle θ1 of the output gear 81.

Herein, according to the theorem of cosines, the length e, the angle φ1, and the angle φ2 are expressed by the following Formulas (25) to (27), respectively.

[Math. 25]

$$e = \sqrt{a^2 + d^2 - 2ad\cos\theta_1} \quad (25)$$

$$\phi_1 = \cos^{-1}\left(\frac{e^2 + d^2 - a^2}{2ed}\right) \quad (26)$$

$$\phi_2 = \cos^{-1}\left(\frac{e^2 + c^2 - b^2}{2ec}\right) \quad (27)$$

Also, the opening angle θ0 is expressed by the following Formula (28).

[Math. 26]

$$\theta_0 = \frac{\pi}{2} - \phi_1 - \phi_2 \quad (28)$$

Therefore, the following Formula (29) is derived by substituting Formulas (25) to (27) into Formula (28).

[Math. 27]

$$\theta_0 = \frac{\pi}{2} - \left(\cos^{-1}\left(\frac{d - a\cos\theta_1}{\sqrt{a^2 + d^2 - 2ad\cos\theta_1}}\right) + \cos^{-1}\left(\frac{a^2 - b^2 + c^2 + d^2 - 2ad\cos\theta_1}{2c\sqrt{a^2 + d^2 - 2ad\cos\theta_1}}\right)\right) \quad (29)$$

Formula (29) expresses the relationship between the opening angle θ0 and the rotation angle θ1 of the output gear 81. For example, according to Formula (29), in the case of applying 95 [mm], 200 [mm], 63 [mm], and 200 [mm] as the lengths a, b, c, and d, respectively, the relationship between the opening angle θ0 and the rotation angle θ1 is expressed by the graph illustrated in FIG. 17. Note that in FIG. 17, the values of the opening angle θ0 and the rotation angle θ1 are expressed in units of radians. Hereinafter, an example of applying 95 [mm], 200 [mm], 63 [mm], and 200 [mm] as the lengths a, b, c, and d, respectively, will be described.

According to FIG. 17, the amount of increase or decrease in the opening angle θ0 in the case of increasing or decreasing the rotation angle θ1 by the angle of a predetermined amount of increase or decrease is large compared to the predetermined amount of increase or decrease for the rotation angle θ1. In other words, the angular range of the opening angle θ0 corresponding to a predetermined angular range for the rotation angle θ1 is large compared to the predetermined angular range for the rotation angle θ1. In this way, the range that the opening angle θ0 may take may be set to be large compared to the range that the rotation angle θ1 may take. Specifically, the relationship between the range that the opening angle θ0 may take and the range that the rotation angle θ1 may take may be stipulated by setting the values of the lengths a, b, c, and d appropriately.

In this way, in the present embodiment, by having at least part of the link mechanism 50 form the trapezoidal link mechanism 52, the range that the opening angle θ0 may take in the link mechanism 50 can be made large compared to the range that the rotation angle θ1 of the output gear 81 may take. With this arrangement, since the range of motion of the link mechanism 50 can be expanded, limitations on the attitude of the support apparatus 1 can be minimized. Note that specific examples of the range that each of the opening angle θ0 and the rotation angle θ1 may take will be described later.

Herein, the range that the opening angle θ0 may take corresponds to the rotatable angle of the link 46, and the range that the rotation angle θ1 may take corresponds to the rotatable angle of the link 42. Also, the link 46 and the link 42 correspond to the second link and the first link, respectively. Therefore, the rotatable angle of the second link may be set to be large compared to the rotatable angle of the first link.

[3-3. Reduction Ratio of Non-Circular Gears]

Figure 18:
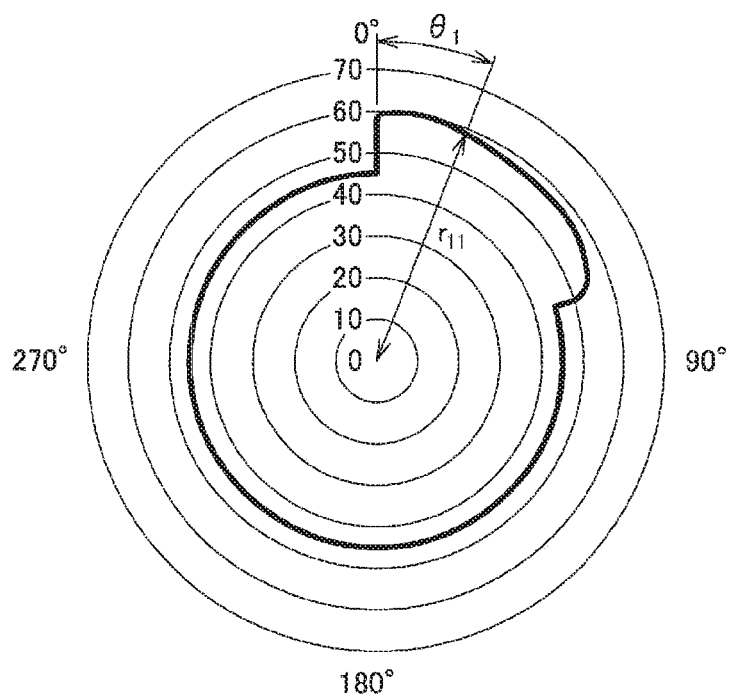
FIG. 18 is an explanatory diagram illustrating an example of the shape, including the attaching part, of the output gear according to the present embodiment.
Figure 19:
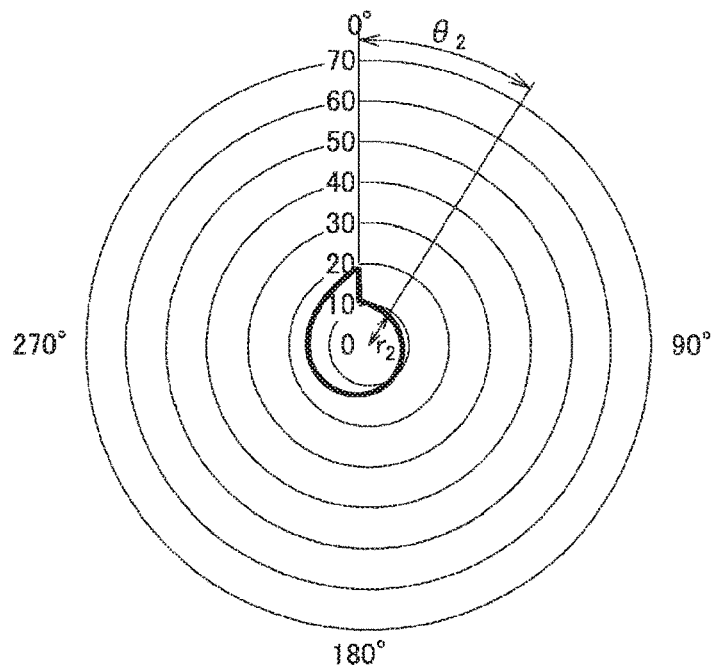
FIG. 19 is an explanatory diagram illustrating an example of the shape, including the attaching part, of the input gear according to the present embodiment.
Figure 20:
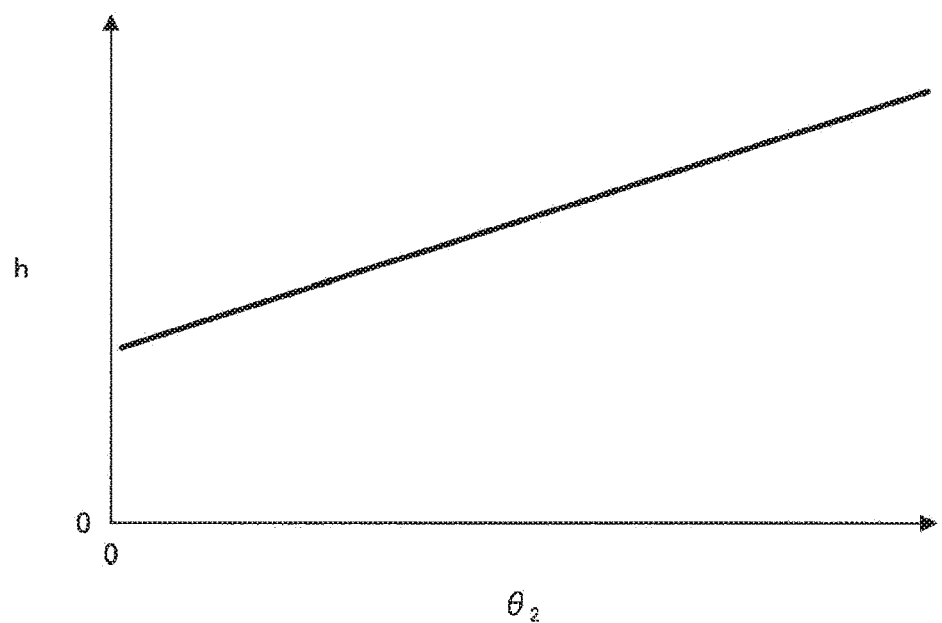
FIG. 20 is an explanatory diagram illustrating an example of the relationship between the rotation angle of the input gear and the length in the extension-contraction direction of the link mechanism according to the present embodiment.

Next, FIGS. 18 to 20 will be referenced to describe the reduction ratio of the non-circular gears 80 in detail.

Herein, to simplify the handling of formulas, if the right side of Formula (29) is approximated as a cubic equation with respect to the rotation angle θ1, the opening angle θ0 is expressed by the following Formula (30). Note that in Formula (30), t, u, v, and w are constants. Specifically, the values of the constants t, u, v, and w are set according to the values of the lengths a, b, c, and d described above.

[Math. 28]

$$\theta_0 = t\theta_1^3 + u\theta_1^2 + v\theta_1 + w \quad (30)$$

As described earlier, the properties of the reduction ratio N of the non-circular gears 80 depend on the relationship between the rotation angle θ1 and the rotation angle θ2. Therefore, by stipulating the relationship between the rotation angle θ1 and the rotation angle θ2, the properties of the reduction ratio N can be set. Specifically, by appropriately using Formula (24) and Formula (30), the relationship between the rotation angle θ1 and the rotation angle θ2 can be stipulated such that the reduction ratio N has the desired properties. Hereinafter, an example will be described in which Formula (24) and Formula (30) are used to stipulate the relationship between the rotation angle θ1 and the rotation angle θ2 such that the reduction ratio N has the desired properties.

Herein, the relationship expressed by the following Formula (31) is applied as the relationship between h/L and the rotation angle θ2, for example. Note that in Formula (31), k and b are constants.

[Math. 29]

$$\frac{h}{L} = k\theta_2 + b \quad (31)$$

In this case, the following Formula (32) is derived from Formula (24) and Formula (31).

[Math. 30]

$$\sqrt{8\sin^2\frac{\theta_0}{2} + 1} = k\theta_2 + b \quad (32)$$

Herein, the following Formula (33) is derived by substituting Formula (30) into Formula (32).

[Math. 31]

$$k\theta_2 + b = \sqrt{8\sin^2\left(\frac{t\theta_1^3 + u\theta_1^2 + v\theta_1 + w}{2}\right) + 1} \quad (33)$$

Formula (33) expresses the relationship between the rotation angle θ1 of the output gear 81 and the rotation angle θ2 of the input gear 82. The following Formula (34) is derived by taking the time derivative of both sides of Formula (33).

[Math. 32]

$$k\dot\theta_2 = \frac{8\left(\frac{3t\theta_1^2 + 2u\theta_1 + v}{2}\right)\cos\left(\frac{t\theta_1^3 + u\theta_1^2 + v\theta_1 + w}{2}\right)\sin\left(\frac{t\theta_1^3 + u\theta_1^2 + v\theta_1 + w}{2}\right)}{\sqrt{8\sin^2\left(\frac{t\theta_1^3 + u\theta_1^2 + v\theta_1 + w}{2}\right) + 1}}\dot\theta_1 \quad (34)$$

Herein, α and β are defined as illustrated in the following Formula (35) and Formula (36).

[Math. 33]

$$\alpha = \frac{3t\theta_1^2 + 2u\theta_1 + v}{2} \quad (35)$$

$$\beta = \frac{t\theta_1^3 + u\theta_1^2 + v\theta_1 + w}{2} \quad (36)$$

The following Formula (37) is derived by substituting Formula (35) and Formula (36) into Formula (34).

[Math. 34]

$$k\dot\theta_2 = \frac{8\alpha\cos\beta\sin\beta}{\sqrt{8\sin^2\beta + 1}}\dot\theta_1 \quad (37)$$

Herein, ε is defined as illustrated in the following Formula (38).

[Math. 35]

$$\varepsilon = \frac{8\alpha\cos\beta\sin\beta}{\sqrt{8\sin^2\beta + 1}} \quad (38)$$

The following Formula (39) is derived by substituting Formula (38) into Formula (37).

[Math. 36]

$$k\dot\theta_2 = \varepsilon\dot\theta_1 \quad (39)$$

Meanwhile, in the non-circular gears 80 according to the present embodiment, for the rotation angle θ1 and the rotation angle θ2, the following Formula (40) holds similarly to Formula (11) described above. Note that in the following, r1 is described as the pitch curve radius of the output gear 81, r2 is described as the pitch curve radius of the input gear 82, and d is described as the distance between each of the centers of rotation of the input gear 82 and the output gear 81.

[Math. 37]

$$r_1\dot\theta_1 = (d - r_1)\dot\theta_2 \quad (40)$$

Herein, the following Formula (41) is derived by solving the simultaneous equations of Formula (39) and Formula (40), and eliminating $\dot\theta_1$ and $\dot\theta_2$.

[Math. 38]

$$r_1 = \frac{\varepsilon d}{\varepsilon + k} \quad (41)$$

Also, the sum of the pitch curve radius r1 of the output gear 81 and the pitch curve radius r2 of the input gear 82 is equal to the distance d between each of the centers of rotation of the input gear 82 and the output gear 81. Therefore, the following Formula (42) is derived from Formula (41).

[Math. 39]

$$r_2 = \frac{d}{1 + \frac{\varepsilon}{k}} \quad (42)$$

Therefore, the reduction ratio N of the non-circular gears 80 is expressed by the following Formula (43).

[Math. 40]

$$N = \frac{r_1}{r_2} = \frac{\varepsilon}{k} \quad (43)$$

As described above, the relationship between the rotation angle θ1 of the output gear 81 and the rotation angle θ2 of the input gear 82 is expressed according to Formula (33). Additionally, the reduction ratio N having properties according to the relationship between the rotation angle θ1 and the rotation angle θ2 is expressed by Formula (43). According to Formula (33), the relationship between the rotation angle $\theta 1$ and the rotation angle $\theta 2$ specifically depends on the set values of the constants k and b.

The constants k and b in Formula (33) may be set such that the range that the opening angle $\theta 0$ corresponding to the rotation angle $\theta 2$ may take becomes a desired range, for example. As an example, in the following, a case will be described in which the range that the rotation angle $\theta 2$ may take is from 0° to 360°, and the constants k and b are set such that the range that the opening angle $\theta 0$ may take with respect to such a rotation angle $\theta 2$ is from 24.8° to 161.0°.

For example, assume that when the opening angle $\theta 0$ is 24.8°, the rotation angle $\theta 2$ is 0°. With this arrangement, the constant b is set to 1.171, on the basis of such a relationship between the opening angle $\theta 0$ and the rotation angle $\theta 2$, and also Formula (32). On the other hand, assume that when the rotation angle $\theta 0$ is 161.0°, the rotation angle $\theta 2$ is 360°. With this arrangement, the constant k is set to 0.285, on the basis of such a relationship between the opening angle $\theta 0$ and the rotation angle $\theta 2$, and also Formula (32).

Also, by using the formulas obtained by substituting the values of the constant k and the distance d into each of Formula (41) and Formula (42), it becomes possible to compute each of the pitch curve radius r1 and the pitch curve radius r2 with respect to the rotation angle $\theta 1$ and the rotation angle $\theta 2$. Herein, in the case of setting the distance d to 70 [mm], specific examples of the shapes of the output gear 81 and the input gear 82 corresponding to the pitch curve radius r1 and the pitch curve radius r2 computed in this way are illustrated in FIGS. 18 and 19. Specifically, FIGS. 18 and 19 are explanatory diagrams illustrating an example of the shape, including the attaching part, of the output gear 81 and the input gear 82, respectively. Note that in FIGS. 18 and 19, the teeth of each gear are represented by a pitch curve.

As described above, in each gear of the non-circular gears 80, an attaching part for attaching the gear to another member is formed. Specifically, in the output gear 81 and the input gear 82, an attaching part for attaching the gear to the link 41 illustrated in FIG. 14 is formed. Also, the shape of each gear may be designed appropriately from the perspective of the simplicity of manufacturing and the stability of tooth engagement. More specifically, FIGS. 18 and 19 illustrate the shape of each gear designed appropriately in this way.

Also, the reduction ratio N of the non-circular gears 80 for each opening angle $\theta 0$ is computable on the basis of Formula (30), Formula (35), Formula (36), Formula (38), and Formula (43). Specifically, in the case in which the opening angle $\theta 0$ is 24.8°, the reduction ratio N computed on the basis of each formula above becomes 6.12, while in the case in which the opening angle $\theta 0$ is 161.0°, the reduction ratio N computed on the basis of each formula above becomes 2.8.

According to each formula above, the reduction ratio N of the non-circular gears 80 according to the present embodiment specifically becomes larger as the opening angle $\theta 0$ approaches 12.4°. In other words, the reduction ratio N becomes larger as the link mechanism 50 contracts. Therefore, even in the case in which the link mechanism 50 takes a relatively contracted attitude, an increase in the output torque of the drive motor 70 can be prevented. Also, the reduction ratio N of the non-circular gears 80 becomes smaller as the opening angle $\theta 0$ approaches 161.0°. In other words, the reduction ratio N becomes smaller as the link mechanism 50 extends. Therefore, even in the case in which the link mechanism 50 takes a relatively extended attitude, an increase in the rotation rate of the drive motor 70 can be prevented.

In this way, the reduction ratio N of the non-circular gears 80 according to the present embodiment is set to become larger as the length in the extension-contraction direction of the link mechanism 50 becomes shorter. With this arrangement, in the support apparatus 1, a change in the reduction ratio according to the properties of the demanded values of the rotation rate and the torque of the motive power transmitted to the link mechanism 50 is achievable with a variable speed mechanism having relatively few component parts. Therefore, it is possible to miniaturize the apparatus more effectively.

Herein, the value of the rotation angle $\theta 1$ for each opening angle $\theta 0$ is computable on the basis of Formula (30). Specifically, in the case in which the opening angle $\theta 0$ is 24.8°, the rotation angle $\theta 1$ computed on the basis of Formula (30) becomes 49°, and in the case in which the opening angle $\theta 0$ is 161.0°, the rotation angle $\theta 1$ computed on the basis of Formula (30) becomes 122°. In this way, in the present embodiment, by having at least part of the link mechanism 50 form the trapezoidal link mechanism 52, the range that the opening angle $\theta 0$ may take in the link mechanism 50 can be made large compared to the range that the rotation angle $\theta 1$ of the output gear 81 may take. With this arrangement, since the range of motion of the link mechanism 50 can be expanded, limitations on the attitude of the support apparatus 1 can be minimized.

Additionally, in the trapezoidal link mechanism 52, as illustrated in FIG. 16, the link length a of the link 42 corresponding to the first link on the input side which is rotatable under motive power input through the pair of non-circular gears 80 may also be long compared to the link length c of the link 46 corresponding to the second link on the output side which is disposed opposite the link 42 and which is rotatable in accordance with the rotation of the link 42. With this arrangement, the trapezoidal link mechanism 52 may have a function of acting as a variable speed mechanism that reduces and outputs the rotation rate of the input motive power to the output side.

As described above, the reduction ratio N specifically becomes smaller as the link mechanism 50 extends. Therefore, as illustrated in FIG. 19, as the rotation angle $\theta 2$ of the input gear 82 becomes larger, the pitch curve radius r2 of the input gear 82 may become larger. With this arrangement, a difference in the pitch curve radius r2 may occur between the case in which the rotation angle $\theta 2$ is relatively small and the case in which the rotation angle $\theta 2$ is relatively large. In cases in which such a different in the pitch curve radius r2 is relatively large, manufacturing the input gear 82 may become difficult. Also, in such cases, the tooth engagement of each gear in the non-circular gears 80 may become unstable.

As described above, the trapezoidal link mechanism 52 according to the present embodiment may have a function of acting as a variable speed mechanism that reduces and outputs the rotation rate of the input motive power to the output side. With this arrangement, the pitch curve radius r2 in the case in which the rotation angle $\theta 2$ is relatively large can be decreased. Therefore, since the difference in the pitch curve radius r2 between the case in which the rotation angle $\theta 2$ is relatively small and the case in which the rotation angle $\theta 2$ is relatively large can be decreased, the shape of the input gear 82 can be made to approach a true circle. Thus, simple manufacturing and stable tooth engagement of each gear in the non-circular gears 80 can be achieved.

Also, as described above, the input gear 82 and the rotating shaft of the drive motor 70 may be coupled directly, or via one or more circular gears. In other words, the rotation angle of the drive motor 70 may also be correlated with the rotation angle $\theta 2$ of the input gear 82. According to Formula (31), the distance h in the vertical direction from the portion of the support apparatus 1 in contact with the floor, namely the other end part P1 of the link 48, to the rotating shaft 22 has a linear relationship with the rotation angle $\theta 2$ of the input gear 82. Also, as described above, the distance h corresponds to the length in the extension-contraction direction of the link mechanism 50. FIG. 20 is an explanatory diagram illustrating an example of the relationship between the rotation angle $\theta 2$ and the distance h corresponding to the length in the extension-contraction direction of the link mechanism 50.

In this way, the length in the extension-contraction direction of the link mechanism 50 may also have a linear relationship with the rotation angle of the drive motor 70. With this arrangement, formulas related to the control of the drive motor 70 in the support apparatus 1 can be simplified. Therefore, the computational complexity in the drive control of the support apparatus 1 can be reduced.

4. CONCLUSION

As described above, according to an embodiment of the present disclosure, the pair of non-circular gears 80 outputs motive power output from the drive motor 70 to the link mechanism 50 by a reduction ratio according to the attitude of the link mechanism 50. Specifically, the reduction ratio of the non-circular gears 80 is set to become larger as the length in the extension-contraction direction of the link mechanism 50 becomes shorter. With this arrangement, in the support apparatus 1, a change in the reduction ratio according to the properties of the demanded values of the rotation rate and the torque of the motive power transmitted to the link mechanism 50 is achievable with a variable speed mechanism having relatively few component parts. Therefore, it is possible to miniaturize the apparatus more effectively.

Also, in the present embodiment, by having at least part of the link mechanism 50 form the trapezoidal link mechanism 52, the range that the opening angle $\theta 0$ may take in the link mechanism 50 can be made large compared to the range that the rotation angle $\theta 1$ of the output gear 81 may take. With this arrangement, since the range of motion of the link mechanism 50 can be expanded, limitations on the attitude of the support apparatus 1 can be minimized.

Note that although the above describes an example of applying a pair of non-circular gears as a pair of rotating bodies provided in a support apparatus, but the technical scope of the present disclosure is not limited to such an example. It is sufficient for the pair of rotating bodies to have a function of acting as a variable speed mechanism that outputs motive power output from a drive motor to a link mechanism by a reduction ratio according to the attitude of the link mechanism. For example, the pair of rotating bodies may also be a pair of pulleys. In this case, a power transmission member such as a belt or chain that transmits motive power between the pair of pulleys is wound between the pair of pulleys. In addition, the reduction ratio of the pair of pulleys is expressed by the ratio of the radius of the output pulley, which is the rotating body on the output side, with respect to the input pulley, which is the rotating body on the input side that receives motive power from the drive motor side.

Note that although the above describes an example of the configuration of the support apparatus 1 according to the present embodiment with reference to FIG. 14, the configuration of the support apparatus 1 is not particularly limited to such an example. For example, the number and arrangement of trapezoidal link mechanisms in the link mechanism are not particularly limited. Also, in the link mechanism, one or more parallel link mechanisms may be formed as appropriate. In this case, the number and arrangement of parallel links in the link mechanism are not particularly limited.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A support apparatus including:

a drive motor;

a link mechanism that, by transmitting motive power output from the drive motor, is extendable and contractable in response to the motive power; and a pair of rotating bodies that act as a variable speed mechanism that outputs the motive power to the link mechanism by a reduction ratio according to an attitude of the link mechanism, in which at least part of the link mechanism forms a trapezoidal link mechanism.

(2)

The support apparatus according to (1), in which the reduction ratio is set to become larger as a length in an extension-contraction direction of the link mechanism becomes shorter.

(3)

The support apparatus according to (1) or (2), in which a length in an extension-contraction direction of the link mechanism has a linear relationship with a rotation angle of the drive motor.

(4)

The support apparatus according to any one of (1) to (3), in which the trapezoidal link mechanism includes a first link on an input side that is rotatable under the motive power input through the pair of rotating bodies, a second link on an output side which is disposed opposite the first link and which is rotatable in accordance with the rotation of the first link, and a third link and a fourth link that face opposite each other and rotatably couple the first link and the second link.

(5)

The support apparatus according to (4), in which a rotatable angle of the second link is set to be large compared to a rotatable angle of the first link.

(6)

The support apparatus according to (4) or (5), in which a relative position, with respect to the third link, of each rotating shaft of the pair of rotating bodies is fixed, and the first link is rotatable as one with the rotating body on the output side in the pair of rotating bodies.

(7)
The support apparatus according to any one of (1) to (6), in which in the pair of rotating bodies, a rotation angle of the rotating body on an output side has a non-linear relationship with a rotation angle of the rotating body on an input side that receives the motive power.

(8)
The support apparatus according to any one of (1) to (7), in which the pair of rotating bodies is a pair of spur gears.

(9)
The support apparatus according to any one of (1) to (7), in which the pair of rotating bodies is a pair of pulleys.

REFERENCE SIGNS LIST 1, 10, 90 support apparatus
21, 22 rotating shaft
24, 26, 28, 30, 32, 34 axle
41, 42, 44, 46, 47, 48 link
50 link mechanism
52 trapezoidal link mechanism
70 drive motor
80 pair of non-circular gears
81 output gear
82 input gear
102 mass
104 connecting section
122, 124 axle
142, 144 link
150 link mechanism
170 drive motor
180 pair of non-circular gears
181 output gear
182 input gear
902 mass
922, 924 axle
942, 944 link
950 link mechanism

The invention claimed is:
1. A support apparatus, comprising:
a drive motor configured to transmit motive power output to a link mechanism;
the link mechanism that is extendable and contractable based on the transmitted motive power; and
a pair of rotating bodies configured to output the motive power to the link mechanism by a reduction ratio of the pair of rotating bodies, wherein the reduction ratio, of the pair of rotating bodies, corresponds to an attitude of the link mechanism, wherein
the pair of rotating bodies act as a variable speed mechanism,
a first rotating body of the pair of rotating bodies is connected to the drive motor and a second rotating body of the pair of rotating bodies is connected to the link mechanism,
the reduction ratio of the pair of rotationg bodies increases when a rotation angle, of the second rotating body of the pair of rotating bodies, approaches a specific angle,
link mechanism comprises a trapezoidal link mechanism and a parallel link mechanism,
the parallel link mechanism comprises a first parallel link, a second parallel link, and a third parallel link,
the first parallel link is between the second rotating body and the second parallel link,
the second parallel link is between the first parallel link and the third parallel link,
the third parallel link is between the second parallel link and an end part of the link mechanism, and
a first opening angle between the first parallel link and the second parallel link is equal to a second opening angle between the second parallel link and the third parallel link.

2. The support apparatus according to claim 1, wherein the reduction ratio increases based on a decrease in a length of the link mechanism, in an extension-contraction direction.

3. The support apparatus according to claim 1, wherein a length of the link mechanism, in an extension-contraction direction, has a linear relationship with a rotation angle of the drive motor.

4. The support apparatus according to claim 1, wherein the trapezoidal link mechanism includes:
a first trapezoidal link on an input side of the link mechanism, that is rotatable under the motive power which is input via the pair of rotating bodies,
a second trapezoidal link, on an output side, which is: disposed opposite the first trapezoidal link, and rotatable based on the rotation of the first trapezoidal link, and
a third trapezoidal link and a fourth trapezoidal link that face opposite each other, and
the third trapezoidal link and the fourth trapezoidal link rotatably couple the first trapezoidal link and the second trapezoidal link.

5. The support apparatus according to claim 4, wherein a rotatable angle of the second trapezoidal link is larger than a rotatable angle of the first trapezoidal link.

6. The support apparatus according to claim 4, wherein a relative position of each rotating shaft of a plurality of rotating shafts of the pair of rotating bodies, with respect to the third trapezoidal link, is fixed, and
the first trapezoidal link is rotatable as one with the second rotating body on an output side of the pair of rotating bodies.

7. The support apparatus according to claim 1, wherein in the pair of rotating bodies, the rotation angle of the second rotating body of the pair of rotating bodies, has a non-linear relationship with a rotation angle of the first rotating body of the pair of rotating bodies,
the first rotating body is on an input side of the pair of rotating bodies, and
the input side receives the motive power.

8. The support apparatus according to claim 1, wherein the pair of rotating bodies is a pair of spur gears.

* * * * *